United States Patent
Costello et al.

(10) Patent No.: US 12,259,997 B2
(45) Date of Patent: Mar. 25, 2025

(54) DYNAMIC EVALUATION OF DATA STORE ACCESS PERMISSIONS

(71) Applicant: AppOmni, Inc., San Francisco, CA (US)

(72) Inventors: Aaron Costello, Dublin (IE); Timothy Bach, Emeryville, CA (US)

(73) Assignee: AppOmni, Inc., San Francisco, CA (US)

(*) Notice: Subject to any disclaimer, the term of this patent is extended or adjusted under 35 U.S.C. 154(b) by 364 days.

(21) Appl. No.: 17/678,961

(22) Filed: Feb. 23, 2022

(65) Prior Publication Data

US 2023/0267225 A1    Aug. 24, 2023

(51) Int. Cl.
*G06F 21/62* (2013.01)
(52) U.S. Cl.
CPC .. *G06F 21/6227* (2013.01); *G06F 2221/2141* (2013.01)
(58) Field of Classification Search
None
See application file for complete search history.

(56) References Cited

U.S. PATENT DOCUMENTS

| | | | |
|---|---|---|---|
| 7,614,078 B1* | 11/2009 | Stieglitz | H04L 9/321 713/157 |
| 11,003,645 B1* | 5/2021 | Thompson | G06F 16/26 |
| 2009/0216766 A1* | 8/2009 | Vignet | G06F 16/248 |
| 2011/0010761 A1* | 1/2011 | Doyle | G06F 21/6218 726/5 |
| 2014/0208399 A1* | 7/2014 | Ponzio, Jr. | H04L 63/10 726/4 |
| 2014/0282683 A1* | 9/2014 | Chee | H04N 21/4112 725/110 |
| 2019/0239076 A1* | 8/2019 | Chauhan | H04L 67/34 |
| 2020/0065511 A1* | 2/2020 | Rickard, Jr. | G06F 21/604 |
| 2023/0141952 A1* | 5/2023 | West | G06F 21/6218 707/785 |

* cited by examiner

*Primary Examiner* — Bassam A Noaman
(74) *Attorney, Agent, or Firm* — Van Pelt, Yi & James LLP

(57) ABSTRACT

Dynamic evaluation of data store access store permissions is disclosed: obtaining a set of record identifiers (IDs) associated with a selected data store associated with an external system; determining record-level access permissions associated with a user for records in the selected data store associated with the set of record IDs; inferring one or more data store-level access permissions associated with the user for the selected data store based at least in part on the record-level access permissions associated with the user for the records in the selected data store; and presenting the inferred one or more data store-level access permissions associated with the user at a user interface.

19 Claims, 16 Drawing Sheets

Table_Employee

| Record ID | Time | First Name | Last Name | ... |
|---|---|---|---|---|
| 8556 | 2019-04-03 | First_Name_G | Last_Name_Y | ... |
| 0365 | 2018-12-12 | First_Name_f | Last_Name_w | ... |
| 7892 | 2020-06-15 | First_Name_w | Last_Name_X | ... |
| 2060 | 2016-01-25 | First_Name_Q | Last_Name_w | ... |
| 0023 | 2021-08-04 | First_Name_h | Last_Name_U | ... |
| 7698 | 2021-03-14 | First_Name_J | Last_Name_T | ... |
| 0098 | 2016-05-07 | First_Name_m | Last_Name_b | ... |
| 4522 | 2016-01-04 | First_Name_R | Last_Name_g | ... |
| 0925 | 2017-11-14 | First_Name_i | Last_Name_U | ... |
| 5769 | 2021-10-02 | First_Name_U | Last_Name_O | ... |
| 0203 | 2019-06-01 | First_Name_K | Last_Name_c | ... |
| 0651 | 2018-07-09 | First_Name_B | Last_Name_b | ... |
| 0007 | 2019-04-17 | First_Name_S | Last_Name_v | ... |
| 0401 | 2015-10-29 | First_Name_K | Last_Name_X | ... |
| 0075 | 2021-02-23 | First_Name_g | Last_Name_q | ... |
| 0134 | 2021-10-02 | First_Name_B | Last_Name_Y | ... |
| ... | ... | ... | ... | ... |

| Record ID | 0007 | 0023 | 0075 | 0098 | 0134 | 0203 | 0365 | 0401 | 0651 | 0925 | 2060 | 4522 | 5769 | 7698 | 7892 | 8856 | ... |

Sampled Record IDs: 0007, 0023, 0075, 0098, 0134, 0203, 0365, 0401

FIG. 7C

| 0007 | 0023 | 0075 | 0098 | 0134 | 0203 | 0365 | 0401 |

Table_Employee_Department

| Record ID | Time | #ref1_Table_Employee | #ref2_Table_Employee | Department | ... |
|---|---|---|---|---|---|
| 4536 | 2016-02-06 | First_Name_d | Last_Name_A | Customer_Service | ... |
| 3210 | 2018-04-18 | First_Name_B | Last_Name_X | Engineering | ... |
| 0043 | 2019-11-23 | First_Name_D | Last_Name_X | Last_Name_X | ... |
| 2003 | 2020-07-30 | First_Name_x | Last_Name_w | Last_Name_w | ... |
| 0014 | 2021-01-07 | First_Name_k | Last_Name_U | Customer_Service | ... |
| 0001 | 2017-05-09 | First_Name_L | Last_Name_T | Customer_Service | ... |
| 7568 | 2019-03-01 | First_Name_F | Last_Name_b | Last_Name_b | ... |
| 0531 | 2021-01-09 | First_Name_U | Last_Name_g | Last_Name_g | ... |
| 0012 | 2017-11-14 | First_Name_c | Last_Name_U | Last_Name_U | ... |
| 0643 | 2021-04-18 | First_Name_B | Last_Name_O | IT | ... |
| 7152 | 2019-08-24 | First_Name_e | Last_Name_c | Last_Name_c | ... |
| 1624 | 2018-09-07 | First_Name_w | Last_Name_b | Customer_Service | ... |
| 0086 | 2018-12-08 | First_Name_J | Last_Name_D | IT | ... |
| 0675 | 2019-01-11 | First_Name_T | Last_Name_i | Sales | ... |
| 0165 | 2019-07-08 | First_Name_L | Last_Name_B | Human_Resources | ... |
| 0446 | 2021-09-29 | First_Name_w | Last_Name_c | Engineering | ... |
| ... | ... | ... | ... | ... | ... |

FIG. 8

Read Access Evaluation Results for Table_Employee

1202 →

| Record ID | Record-Level Access |
|---|---|
| 0007 | True |
| 0023 | True |
| 0075 | True |
| 0098 | False |
| 0134 | True |
| 0203 | True |
| 0365 | False |
| 0401 | True |

1204 →

| Record ID | Time Access | First_Name Access | Last_Name Access | ... |
|---|---|---|---|---|
| 0007 | True | True | True | ... |
| 0023 | True | True | True | ... |
| 0075 | False | False | False | ... |
| 0098 | False | True | True | ... |
| 0134 | True | False | True | ... |
| 0203 | True | False | True | ... |
| 0365 | False | False | False | ... |
| 0401 | True | True | False | ... |

FIG. 12

| User ID | Table(s) | Table-Level Access | Recommended Actions |
|---|---|---|---|
| User123 | Employee | Read: True<br>Write: True<br>Delete: False | None |
| | Employee_Department | Read: True<br>Write: False<br>Delete: False | None |
| User047 | Employee | Read: True<br>Write: True<br>Delete: True | Restrict user's access to delete this table — 1502 |
| | Employee_Department | Read: True<br>Write: True<br>Delete: False | None |
| ⋮ | ⋮ | ⋮ | ⋮ |

FIG. 15 ns at a system.

DYNAMIC EVALUATION OF DATA STORE ACCESS PERMISSIONS

BACKGROUND OF THE INVENTION

In some contexts, a user's access permissions (e.g., read, write, and/or delete) at a system can be dynamically evaluated by the system during runtime. Because a user's dynamic access permissions at a system are not static over time, they cannot be ascertained offline and need to be evaluated at runtime. A system's dynamic granting and denial of accesses to a user at runtime also depend on a complex set of conditions (e.g., where the resource is located, where the user is located, what time of day the access is performed) and are therefore difficult to predict. It would be desirable to efficiently determine a user's dynamic access permissions at a system.

BRIEF DESCRIPTION OF THE DRAWINGS

Various embodiments of the invention are disclosed in the following detailed description and the accompanying drawings.

FIGS. 7A, B, and C show an example of determining a set of record IDs associated with records to be used to perform a dynamic evaluation of data store-level access permissions for a specified user associated with an organization.

FIG. 8 is a diagram showing an example of a child table that inherits fields from a parent table.

FIG. 12 is a diagram showing example access evaluation results that have been determined for a specified user for read type accesses.

FIG. 15 is a diagram showing an example user interface at which an organization's users' dynamic access evaluation results can be presented.

DETAILED DESCRIPTION

Figure 1:
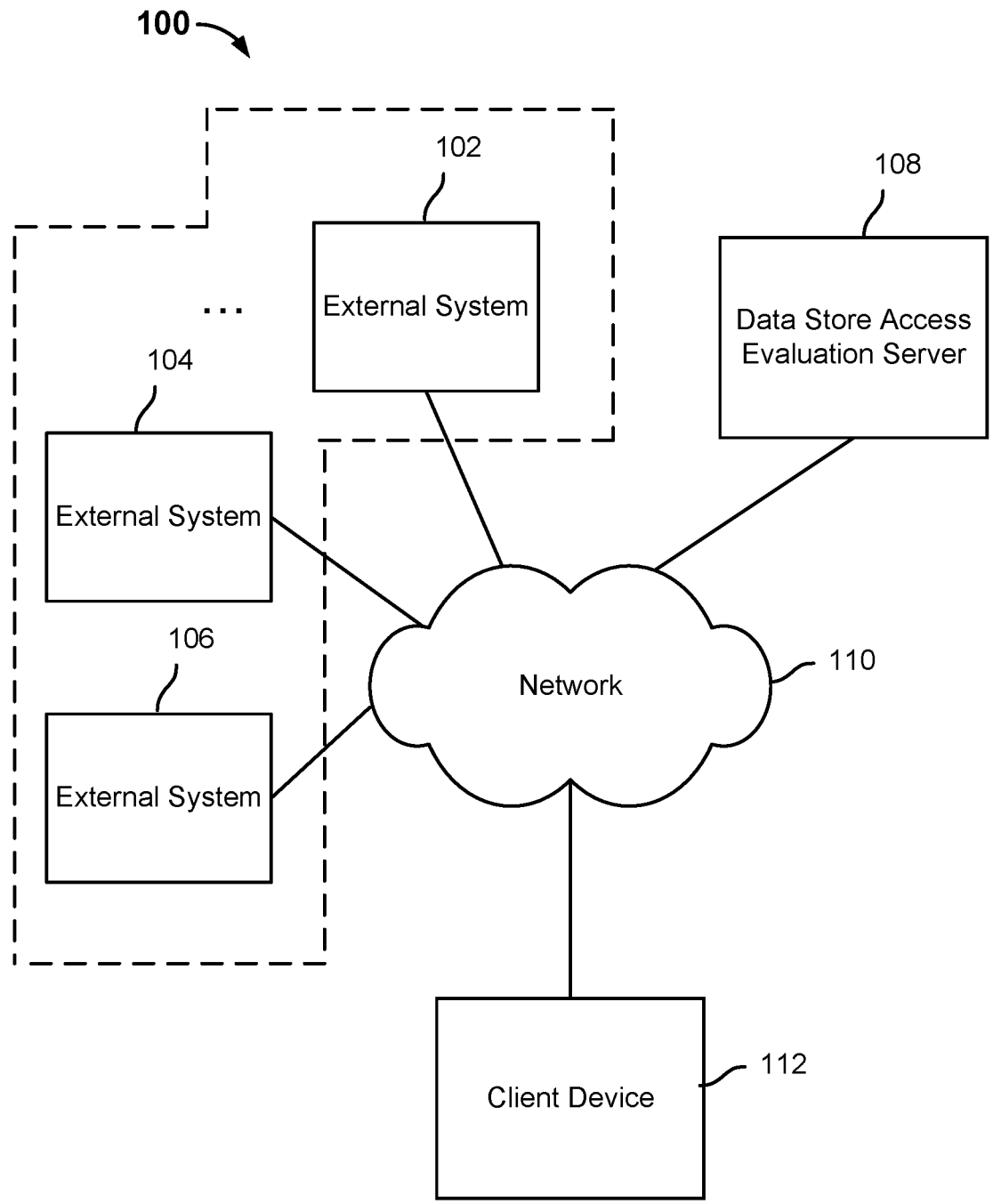
FIG. 1 is a diagram showing an embodiment of a system for performing dynamic evaluation of data store access permissions.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of dynamic evaluation of data store access permissions are described herein. A set of record IDs associated with a selected data store associated with an external system is obtained. In some embodiments, the selected data store comprises one or more tables or other data structures that include records of data. In some embodiments, the external system is a software as a service (SaaS) platform or any platform that stores records of data associated with an organization. In various embodiments, the external system dynamically grants or denies a user access (e.g., a read request, a write request, or a delete request) to the selected data store based on access control lists (ACLs) that are associated with that data store as well as dynamic conditions at runtime. For example, ACLs can be configured by users and/or could be default to a particular external system. In some embodiments, the set of record identifiers (IDs) associated with the selected data store can be selected as a sample of fewer than all record IDs associated with the data store to improve the speed at which the data access levels can be determined. A specified user's record-level access permissions for records identified by the set of record IDs are determined. In some embodiments, for a specified user for which the data store access permissions are being determined, whether that specified user can perform one or more types of accesses (e.g., read, write, and delete) on each record stored at the external system that is associated with a record ID in the set is determined. For example, the external system is queried to determine whether the specified user can perform each of one or more access types on each record associated with each record ID of the set. One or more data store-level access permissions associated with the user for the selected data store are inferred based at least in part on the record-level access permissions associated with the user for the records in the selected data store. For example, the percentage of records associated with the set of records for which the user is permitted to perform a specified access type (e.g., read) is compared to a threshold percentage to determine the user's predicted permission associated with that specified access type (e.g., read) with respect to the selected data store. The inferred one or more data store-level access permissions associated with the user are presented at a user interface.

As will be described in further detail below, the evaluation of a user data store-level access permissions is associated with a point-in-time. As such, the same evaluation for the user can be repeated at different times to assess and detect any (e.g., desirable or undesirable) changes in the user's data store-level access permissions (e.g., in response to an instruction to change the ACL at the external system or a change in the security configurations associated with the user).

FIG. 1 is a diagram showing an embodiment of a system for performing dynamic evaluation of data store access permissions. System 100 includes external system 102, external system 104, external system 106, data store access evaluation server 108, network 110, and client device 112. Network 110 may be implemented using data networks and/or telecommunication networks. External system 102, external system 104, external system 106, data store access evaluation server 108, and client device 112 may communicate to each other over network 110.

Each of external systems 102, 104, and 106 is configured to provide corresponding data stores. In various embodiments, at least some of external systems 102, 104, and 106 are associated with a different SaaS platform. Examples of services provided by SaaS platforms include workflow management, file storing, file sharing, customer relationship management, payroll management, employee data management, human resource data management, and financial management. For example, organizations such as enterprises may subscribe to services provided by one or more SaaS platforms to help manage their businesses. For example, each of external systems 102, 104, and 106 is configured to provide in its respective data store data related to the service that it had provided or provides to one or more organizations. In some embodiments, a data store that is provided by an external system such as external systems 102, 104, and 106 comprises one or more tables or other data structures that are configured to store records of data. In some embodiments, each record of data in the data store also includes one or more fields of data.

During runtime of providing an instance of its service to an organization, an external system such as external systems 102, 104, and 106 is configured to dynamically grant or deny an access request to its data store based on a set of conditions described by one or more ACLs associated with the data store and/or other constraints (e.g., firewalls, other security policies). In some embodiments, an external system is configured to store audit logs that describe the history of which user access requests to a data store had been granted or denied. Because a user's access permissions to an external system's data store are determined at runtime and based on a complex set of conditions, they are challenging to ascertain in advance.

Data store access evaluation server 108 is configured to efficiently determine a given user's access permissions at an external system's data store-level, at runtime, by evaluating that user's permitted or denied accesses to at least a sampled portion of that data store's records. In some embodiments, data store access evaluation server 108 is configured to query each external system (e.g., such as external systems 102, 104, and 106) for which it is to evaluate a user's access permissions for a data store, a set of identifying information (e.g., names of tables/data structures and relationships between tables/data structures) associated with structured data associated with the data store, and also a set of user identifying information (e.g., user IDs that are used by the external system to identify users) associated with one or more organizations. In some embodiments, data store access evaluation server 108 is configured to receive an indication to perform dynamic evaluation of data store access permissions for a specified user and a specified external system (e.g., one of external systems 102, 104, and 106). For example, the indication may be received from client device 112. Client device 112 is configured to be operated by an actor (e.g., a security administrator user) associated with an organization that uses an instance of service that is provided by the specified external system. In response to the indication, data store access evaluation server 108 is configured to determine a data store associated with the specified external system on which to perform the access evaluation for the specified user. For example, data store access evaluation server 108 is configured to select the data store (e.g., one or more tables) associated with the specified external system on which to perform the access evaluation based on heuristics and/or identifying tables that have been custom created by an organization.

Data store access evaluation server 108 is configured to select a set of records from the data store of the external system to use in performing the dynamic access evaluation for the specified user. In some embodiments, data store access evaluation server 108 is configured to select a sample of records by first querying the external system to sort the record IDs of all records associated with the selected data store. Each record's record ID is unique (e.g., within the organization's instance) at an external system and the record IDs of sequentially created records in the same table are typically not sequential in value (e.g., consecutively created records do not have monotonically increasing record ID values). As such, the adjacent records associated with sorted record IDs do not necessarily have meaningful relationships with each other (e.g., such as having been created sequentially in time). After the external system had sorted the record IDs of the selected data store, data store access evaluation server 108 is configured to obtain at least a portion of the sorted record IDs (e.g., the K largest record IDs or the K smallest record IDs, where K is a user configurable number that is one or greater than one). The records associated with the obtained at least portion of the sorted record IDs, which form a random sample set, are then used as the set of records from the data store of the external system to use in performing the dynamic access evaluation for the specified user. In some other embodiments, instead of using record IDs to identify a set/sample of records from the data store, data store access evaluation server 108 is configured to query the external system for audit logs that describe historical external system grants and denials of access to the data store to identify a set of records from the data store of the external system to use in performing the dynamic access evaluation for the specified user. As mentioned above, an external system can store audit logs that describe the history of which user access requests to a data store had been granted or denied. Data store access evaluation server 108 is configured to query a set of audit logs that describe user access requests associated with the specified user as well as the selected data store. The records that are described in this set of audit logs can then form the set of records from the data store of the external system to use in performing the dynamic access evaluation for the specified user.

Data store access evaluation server 108 is configured to determine the specified user's access permissions at the record-level for each record within the previously determined set of records of the selected data store. Where the set of records are identified through their record IDs, as described above, data store access evaluation server 108 is configured to query the external system to determine whether the specified user (e.g., using the specified user's ID) can perform one or more types of access requests (e.g., read, write, delete) for each entire record within the determined set of records in accordance with the external system's ACLs and other security policies. For example, an external system can provide an impersonation function (e.g., via an application programming interface (API)) that can be used by data store access evaluation server 108 to pass the user ID of the specified user to detect whether the specified user can perform each of one or more types of access requests (e.g., read, write, delete) for each entire record within the determined set of records. Where the set of records is identified through audit logs, as described above, data store access evaluation server 108 is configured to parse through the obtained audit logs to determine whether the specified user (e.g., using the specified user's ID) can perform one or more types of access requests (e.g., read, write, delete) for each entire record within the determined set of records in accordance with the external system's (e.g., historical) ACLs and other security policies. In some embodiments, in addition to determining the specified user's permitted or denied accesses at the record-level for each record in the determined set of records, data store access evaluation server 108 is configured to determine, using one of the techniques described above, whether the specified user (e.g., using the specified user's ID) can perform one or more types of access requests (e.g., read or write) for each field of each record within the determined set of records in accordance with the external system's ACLs and other security policies. In some embodiments, data store access evaluation server 108 is configured to present at least a portion of the specified user's determined current access permissions at the record-level and/or at the record field-level at a user interface that is presented at client device 112 (e.g., for an organization's security administrator).

Data store access evaluation server 108 is configured to infer the specified user's access permissions at the selected data store-level using the specified user's determined current access permissions at the record-level for each record within the previously determined set of records of the data store. In some embodiments, for each access type (e.g., read, write, or delete), data store access evaluation server 108 is configured to determine a portion (e.g., percentage) of records from the set of records associated with a selected data store (e.g., a table) that the specified user had been permitted to perform that type of access and then compare that percentage to a threshold percentage. For example, the threshold percentage can be dynamically determined as a function of the number of records in the set of records, the type of access request, and/or the type of the data store that is involved in the evaluation. In the event that the specified user's determined percentage of permitted access meets or exceeds the threshold percentage, then data store access evaluation server 108 is configured to determine that the specified user can perform that type of access request on that data store. Data store access evaluation server 108 is configured to present at a user interface that is provided to client device 112 (e.g., which is operated by an organization's security administrator), the specified user's determined data store-level access permissions.

In some embodiments, data store access evaluation server 108 is configured to compare the specified user's determined record-level and/or data store-level access permissions against one or more rules or sets of desired security configurations. In the event that data store access evaluation server 108 determines a discrepancy between the specified user's determined record-level and/or data store-level access permissions against one or more rules or sets of desired security configurations, data store access evaluation server 108 is configured to determine one or more recommended actions. In some embodiments, data store access evaluation server 108 is configured to present the recommended actions for a viewing (e.g., security administrator) user to manually perform and/or present an interactive element that in response to being selected, data store access evaluation server 108 is configured to use an API associated with the external system to cause an update to be made to the external system's security configurations (e.g., ACLs).

As described above with FIG. 1, data store access evaluation server 108 is configured to infer a specified user's data store-level access permissions with respect to a specified external system's selected data store based on a (e.g., sample) set of records associated with the data store. Because only a portion of the set of records associated with the data store need to be used to infer the specified user's data store-level access permissions, the specified user's dynamic access evaluations can be efficiently performed. As a result, data store access evaluation server 108 can quickly perform a specified user's data store-level access permissions at multiple times to determine any changes (desirable or undesirable) in that user's accesses at that external system. Any detected changes in the specified user's accesses at that external system can then be remedied through manual or programmatic updates to the external system's security configurations (e.g., ACLs) to minimize the risk of subsequent undesirable access issues related to the specified user.

Figure 2:
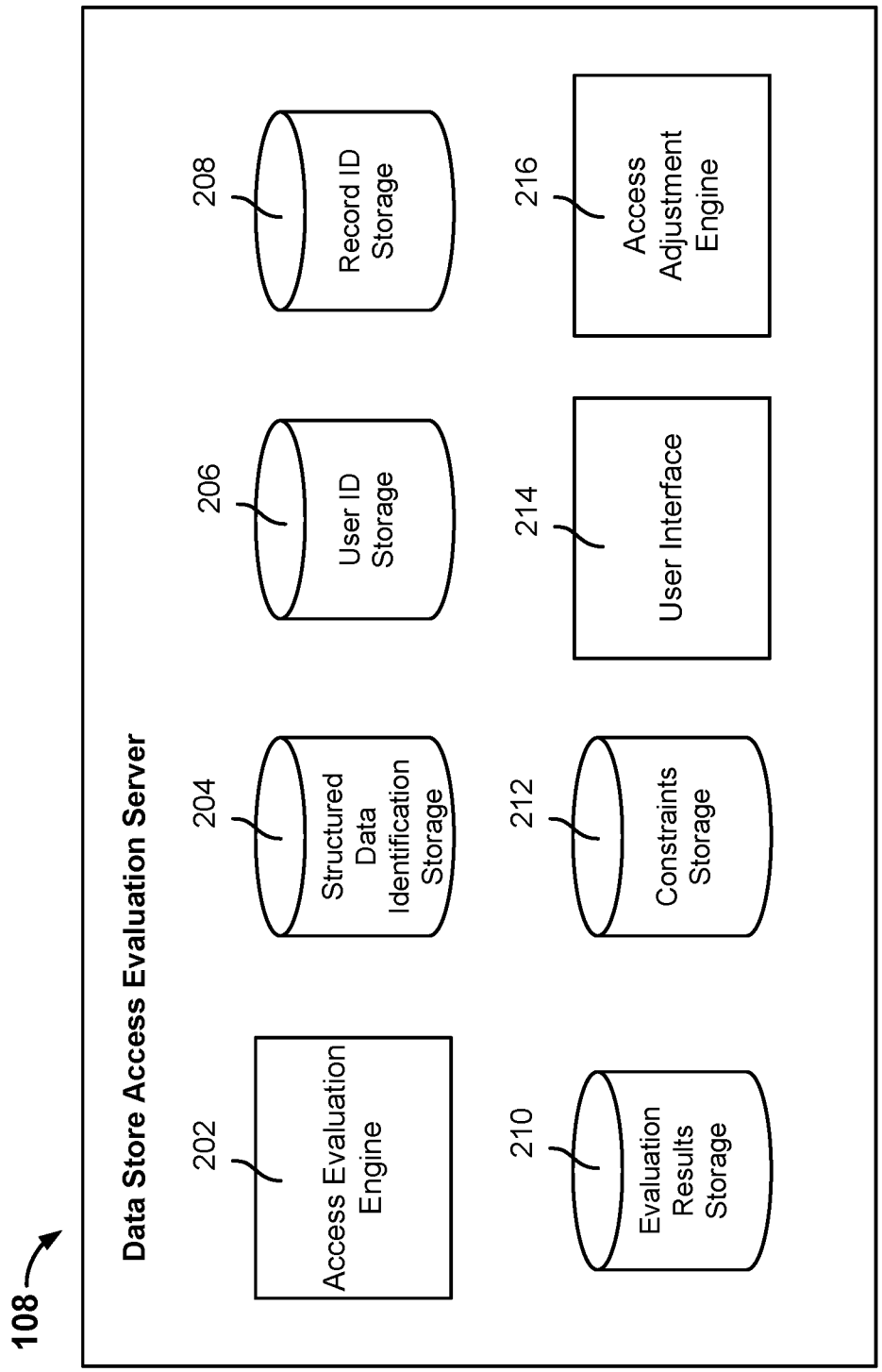
FIG. 2 is a diagram showing an example data store access evaluation server.

FIG. 2 is a diagram showing an example data store access evaluation server. In some embodiments, data store access evaluation server 108 of system 100 of FIG. 1 can be implemented using the example described in FIG. 2. The example data store access evaluation server as shown in FIG. 2 includes access evaluation engine 202, structured data identification storage 204, user ID storage 206, record ID storage 208, evaluation results storage 210, constraints storage 212, user interface 214, and access adjustment engine 216. Each of access evaluation engine 202, user interface 214, and access adjustment engine 216 may be implemented using hardware (e.g., a processor) and/or software. Each of structured data identification storage 204, user ID storage 206, record ID storage 208, evaluation results storage 210, and constraints storage 212 may be implemented using a database or any type of storage medium.

Access evaluation engine 202 is configured to query each of one or more external systems that provides a software instance to a given organization for identifying information (e.g., names or IDs) associated with one or more data stores associated with the given organization and one or more external system-assigned user IDs of users associated with the given organization. For example, the given organization comprises an enterprise and the users associated with the given organization comprise employees, contractors, guests, and/or customers associated with the enterprise. In some embodiments, access evaluation engine 202 is configured to connect to an external system using the stored credentials associated with the organization. Each data store associated with the given organization includes structured data associated with the given organization's software instance, such as one or more tables. Structured data associated with the given organization's software instance includes one or more tables that have been created by the software instance and/or one or more custom tables that have been created by the given organization. Access evaluation engine 202 is configured to store the obtained data store identifying information (e.g., table IDs and field IDs associated with the fields that are present in each table) in structured data identification storage 204 and store the obtained user IDs associated with the corresponding external system in user ID storage 206.

In some embodiments, an external system is configured to support data stores that include tables with parent-child relationships. For example, a child table can inherit the field IDs (but not necessarily field values) of a parent table while being associated with new, child table-specific fields. Some external systems provide a functionality (e.g., an API call) that automatically traverses from a child table to its parent table to locate the inherited field ID of a record in the child table and in a manner that is transparent to the data store. However, not every external system provides such a functionality. Therefore, in some embodiments, access evaluation engine 202 is configured to programmatically identify when a table in a data store of an external system is a child table that inherits field IDs from a parent table and in the event that the table is a child, locate the parent table in the same data store. Access evaluation engine 202 is then configured to store, in structured data identification storage 204, the determined parent-child table relationships between tables of the data store that have been determined to have these relationships. In some embodiments, these stored parent-child table relationships can be used by access evaluation engine 202 to determine a specified user's access permissions on a field-level with respect to a child table, as will be described in further detail below.

Access evaluation engine 202 is configured to receive a request to perform a dynamic access evaluation for a specified user at a specified external system. In some embodiments, a dynamic access evaluation is scheduled to be performed at regular intervals for each of one or more users and at each of one or more external systems. In some embodiments, a dynamic access evaluation is to be performed for a specified user at a specified external system in response to a user instruction (e.g., from an organization's security administrator user). In response to the indication to perform the dynamic access evaluation for the specified user at the specified external system, in some embodiments, access evaluation engine 202 is configured to select a data store associated with the specified external system for which the dynamic access evaluation is to be performed for the specified user. In some embodiments, selecting a data store associated with the specified external system for which the dynamic access evaluation is to be performed for the specified user comprises to select a set of tables (or other data structures) on which to perform the access evaluation. In general, the set of tables is associated with the organization's (with which the specified user is associated) specific instance of the external system's service and can store arbitrary data in record-form. The data stored in the tables can be actual data stored by the external system or simulated/fuzzed data that is uploaded by the organization, for example. In some embodiments, selecting tables can be determined by assigning weights to the tables (e.g., using heuristics) and then selecting a subset of tables based on their corresponding weights. In some embodiments, tables that are determined to have been custom-created by the organization can also be included in the selected set of tables (e.g., custom tables can be identified by a designated prefix in their table IDs). In some embodiments, the number of tables to select can be determined as a function of the size of the tables and the efficiency with which the dynamic access evaluation is expected to be performed for the specified user. In the event that the request to perform the dynamic access evaluation is associated with a scheduled evaluation and the evaluation results are not expected to be returned immediately, access evaluation engine 202 can select a larger number of tables. Otherwise, in the event that the request to perform the dynamic access evaluation is associated with a user instruction and the evaluation results are expected to be generated in real-time, access evaluation engine 202 can select a smaller number of tables to reduce the amount of analysis that is to be performed.

Access evaluation engine 202 is configured to determine a set of records associated with the selected data store (set of tables) to evaluate access permissions for the specified user. In some embodiments, access evaluation engine 202 is configured to determine a number of records to include in the set of records associated with the selected data store (set of tables) based on one or more factors, such as, for example, but not limited to: the total number of records across the selected set of tables and/or historical dynamic access evaluation results that had been determined for the same specified user or for a different user. The greater the number of records that is selected to evaluate access permissions for the specified user, the longer it will take access evaluation engine 202 to evaluate access permissions for the specified user, which is why, in some embodiments, access evaluation engine 202 is configured to select a sample (e.g., a portion/subset) of all records of the selected set of tables associated with the specified external system.

A first example technique of determining a set of records associated with the selected data store (set of tables) to evaluate access permissions for the specified user involves querying the specified external system to provide a set of record IDs associated with the set of records. In this first example technique, access evaluation engine 202 is configured to instruct the specified external system to sort the record IDs of each table within the selected set of tables. As mentioned above, each record's record ID is unique (e.g., within the organization's instance) at an external system and the record IDs of sequentially created records in the same table are typically not sequential in value (e.g., sequentially created records do not have monotonically increasing record ID values). As such, the adjacent records associated with sorted record IDs do not necessarily have meaningful relationships with each other (e.g., such as having been created sequentially in time). After the external system had sorted the record IDs of the selected data store, access evaluation engine 202 is configured to obtain a portion of the sorted record IDs that is equal to the previously determined number of records from a section of the ordered list of record IDs (e.g., the K largest record IDs or the K smallest record IDs, where K is a user configurable number that is one or greater than one). The records associated with the obtained at least portion of the sorted record IDs, which form a random sample set, are then determined as the set of records from the data store of the external system to use in performing the dynamic access evaluation for the specified user. In some embodiments, the determined record IDs are stored at record ID storage 208 or elsewhere. In some embodiments, prior to or after obtaining the record IDs from the external system, access evaluation engine 202 is configured to exclude certain records that match filter criteria (e.g., associated with the record attributes or user attributes) and/or known constraints (e.g., firewall configurations, web application constraints, internal configurations, transaction policies, and scoping policies) stored at constraints storage 212 from the determined set of records.

A second example technique of determining a set of records associated with the selected data store (set of tables) to evaluate access permissions for the specified user is obtaining from the specified external system audit logs of historical user access requests. In this second example technique, access evaluation engine 202 is configured to query the specified external system for a set of audit logs that record user access requests associated with at least the user ID of the specified user and the table IDs of the selected set of tables. In some embodiments, in addition to matching the user ID of the specified user and the table IDs of the selected set of tables, access evaluation engine 202 is configured to obtain from the specified external system audit logs that also match desired criteria (e.g., associated with the record attributes or user attributes) and/or do not match known constraints (e.g., firewall configurations, web application constraints, internal configurations, transaction policies, and scoping policies) stored at constraints storage 212. Access evaluation engine 202 is then configured to parse through the matching audit logs to identify the set of records for which the specified user's access requests were denied or permitted.

Access evaluation engine 202 is configured to determine the specified user's current record-level access permissions (e.g., read, write, and/or delete) for each record in the previously determined set of records associated with the selected data store (set of tables). In some embodiments, in addition to determining the specified user's current record-level access permissions for each record in the previously determined set of records, access evaluation engine 202 is also configured to determine the specified user's field-level access permissions (e.g., read and/or write) for each field in each record in the previously determined set of records.

Where the set of records associated with the selected set of tables to evaluate access permissions for the specified user was determined by querying the specified external system to obtain a set of record IDs, in some embodiments, access evaluation engine 202 is configured to determine the specified user's current record-level access permissions (e.g., read, write, and/or delete) for each record in the set of records by querying the specified external system to evaluate the specified user's permitted or denied access types with respect to each record at the record-level. In some embodiments, where the specified external system provides an impersonation function (e.g., that is accessible by access evaluation engine 202) that allows an administrator to impersonate another user to test/evaluate the impersonated user's access permissions at the external system, this impersonation function is used by access evaluation engine 202 to evaluate the specified user's access permissions at various levels for data stored by the specified external system. For example, access evaluation engine 202 can leverage the impersonation function at the specified external system by calling an appropriate API and passing the user ID of the specified user (e.g., this user ID is stored in user ID storage 206) and also a record ID to determine whether the specified user can perform one or more access types with respect to the entire record associated with that record ID. In some embodiments, if access evaluation engine 202 determines that the specified user can perform a given access type (e.g., read) with respect to the entire record associated with that record ID, then access evaluation engine 202 is configured to call the impersonation function to determine whether the specified user can perform the same access type (e.g., read) with respect to each field of the record associated with the record ID. Access evaluation engine 202 is configured to store for each record included in the set of records that was identified by the set of record IDs whether the specified user is permitted or not to perform one or more types of accesses (e.g., read, write, and/or delete). Access evaluation engine 202 is also configured to store for each field of each record included in the set of records that was identified by the set of record IDs whether the specified user is permitted or not to perform one or more types of accesses (e.g., read and/or write).

Where the set of records associated with the selected set of tables to evaluate access permissions for the specified user was determined by obtaining from the specified external system audit logs of historical user access requests, in some embodiments, access evaluation engine 202 is configured to determine the specified user's record-level access permissions (e.g., read, write, and/or delete) for each record in the set of records by parsing through the audit logs. Because the audit logs record the specified user's historical access requests (e.g., read, write, and/or delete) with respect to records and/or fields associated with the set of tables, access evaluation engine 202 can parse the audit logs to use the recorded denials or grants of the user's actual, historical requests to determine the user's record-level and/or field-level access for the records associated with the set of tables. Unlike simulating/impersonating the specified user's access permissions as described above, parsing through obtained audit logs may not ascertain the specified user's access permissions for all types of access requests or all fields of records associated with a table because the logs only record what the user had historically requested. Access evaluation engine 202 is configured to store for each record that the specified user had historically requested access in the audit logs, whether the specified user was permitted or not to perform one or more types of requested accesses (e.g., read, write, and/or delete). Access evaluation engine 202 is also configured to store for each field of each record that the specified user had historically requested access in the audit logs, whether the specified user was permitted or not to perform one or more types of requested accesses (e.g., read and/or write).

Access evaluation engine 202 is configured to determine the specified user's data store-level access permissions based on the user's record-level access permissions. Where the data store comprises one or more selected tables associated with the specified external system, access evaluation engine 202 is configured to determine the specified user's access permissions to each selected table based on the user's determined record-level access permissions to the records within that table. In some embodiments, access evaluation engine 202 is configured to determine a percentage of records associated with a selected table associated with the specified external system that the specified user can (or has been permitted to) perform a particular access type request (e.g., a read request, a write request, or a delete request) and then compare that percentage against a threshold percentage associated with the table. In some embodiments, the threshold percentage associated with the table can be dynamically determined by access evaluation engine 202. For example, the threshold percentage associated with the table can be determined based on one or more of the following: the access type, the total number of records in the table, and the number of records that were sampled. In the event that the percentage of records associated with a selected table that the specified user can (or has been permitted to) perform the particular access type meets or exceeds the threshold percentage associated with the table, then access evaluation engine 202 is configured to determine that the specified user is (likely) permitted/able to perform that particular access type on the entire table, given the security configurations (e.g., ACLs) associated with the table. Otherwise, in the event that the percentage of records associated with a selected table that the specified user can (or has been permitted to) perform the particular access type is less than the threshold percentage associated with the table, then access evaluation engine 202 is configured to determine that the specified user is (likely) not permitted/able to perform that particular access type on the entire table, given the security configurations (e.g., ACLs) associated with the table.

In some embodiments, access evaluation engine 202 is configured to further restrict the specified user's determined table-level access permissions based on known constraints (e.g., internal configurations/transaction policies/scoping policies) that are stored at constraints storage 212. For example, the constraints may indicate that the specified user is not able to perform a write request to the table, even though the user was determined to (likely) have write access to the table based on the per-record level access permission analysis.

In some embodiments, access evaluation engine 202 is configured to store at least some of the determined record-level, field-level, and/or table-level access permissions associated with the specified user and the specified external system as evaluation results in evaluation results storage 210. In some embodiments, access evaluation engine 202 is configured to send at least some of the determined record-level, field-level, and/or table-level access permissions associated with the specified user and the specified external system to user interface 214 so that user interface 214 can cause at least a portion of the evaluation results to be presented at a user interface that is presented at a webpage or sent to a client device for display.

In some embodiments, access adjustment engine 216 is configured to compare the specified user's determined table-level access permissions to one or more rules. For example, the rules may dictate desired access permissions associated with the specified user and also recommended actions to perform in the event that the determined table-level access permissions do not match the desirable access permissions. In some embodiments, where access adjustment engine 216 determines a discrepancy between the specified user's determined table-level access permissions and the desired access permissions, access adjustment engine 216 is configured to cause user interface 214 to present instructions associated with the recommended actions for the security administrator to manually update the specified user's access at the external system (e.g., through manually updating the ACLs of the relevant table at the external system). In some embodiments, where access adjustment engine 216 determines a discrep- ancy between the specified user's determined table-level access permissions and the desired access permissions, access evaluation engine 202 is configured to cause user interface 214 to present an interactive element (e.g., a selectable button) at the user interface such that, in response to a user selection of the interactive element, access adjustment engine 216 is configured to programmatically send API call(s) to the external system to cause an update to be made with respect to security configurations associated with the relevant table. A first example of an update to be made with respect to security configurations associated with the relevant table can be to update the table's ACLs. A second example of an update to be made with respect to security configurations associated with the relevant table can be to change a protected attribute associated with certain record(s) and/or to change weights denoting suspicious behavior to cause these affected records to be excluded from a subsequent dynamic access evaluation to be performed for the specified user.

Figure 3:
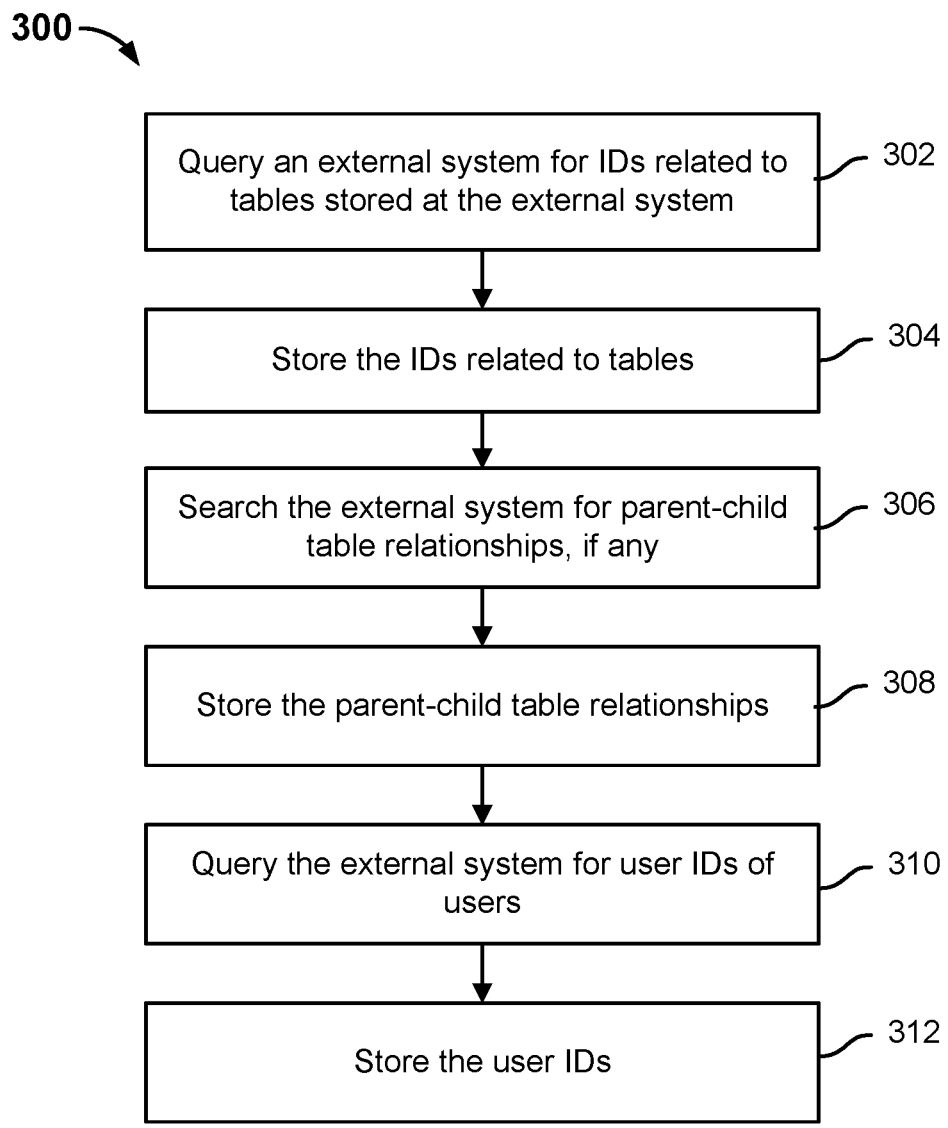
FIG. 3 is a flow diagram showing an example process for collecting table and user ID information from an external system.

FIG. 3 is a flow diagram showing an example process for collecting table and user ID information from an external system. In some embodiments, process 300 is implemented by a data store access evaluation server such as data store access evaluation server 108 of system 100 of FIG. 1.

Process 300 is an example process for collecting table and user ID information from an external system that can be performed for one or more organizations prior to determining dynamic evaluation of data store access permissions for a specified user associated with a particular organization.

At 302, an external system is queried for IDs related to tables stored at the external system. The external system is queried for table IDs as well as other table metadata, such as the field IDs of all fields related to each table ID. The tables are associated with one or more data stores of the external system.

At 304, the IDs related to tables are stored. The table IDs and other table metadata are stored at the data store access evaluation server so that they can be used to select tables and rows therein for a dynamic evaluation of data store access permissions for a specified user.

At 306, the external system is searched for parent-child table relationships, if any. Depending on the external system, parent-child relationships between tables may or may not be supported. In some instances, an external system will support parent-child relationships between tables but will manage these relationships in a manner that is transparent to the data store access evaluation server. Where parent-child relationships between tables are supported by the external system and in a way that is not transparent to the data store access evaluation server, the data store access evaluation server can discover such relationships while collecting table IDs and other metadata. For example, if a field ID related to a table is not a value but a reference to the field of another table, then it is determined that the first table is a child table that has inherited a field from the other, parent table. As such, the reference to the field of the other table can be used to locate the parent table at the external system and to store the parent table's ID as well as its relationship to the child table.

At 308, the parent-child table relationships are stored. As will be described in further detail below, parent-child table relationships can be used (when the external system does not traverse from the child table to its parent table in a manner that is transparent to the data store access evaluation server) to determine a specified field-level access permission for a field of the child table for which the corresponding field ID is inherited from a parent table. In that case, the stored parent-child table relationships can be used by the data store access evaluation server to evaluate the specified user's access permission with respect to the field in the child table given that the field ID had been inherited from the parent table.

At 310, the external system is queried for user IDs of users. The user IDs that are assigned by the external system to users of each organization are obtained from the external system.

At 312, the user IDs are stored. The user IDs are stored at the data store access evaluation server so that they can be used to perform dynamic evaluations of data store access permissions for these users.

Figure 4:
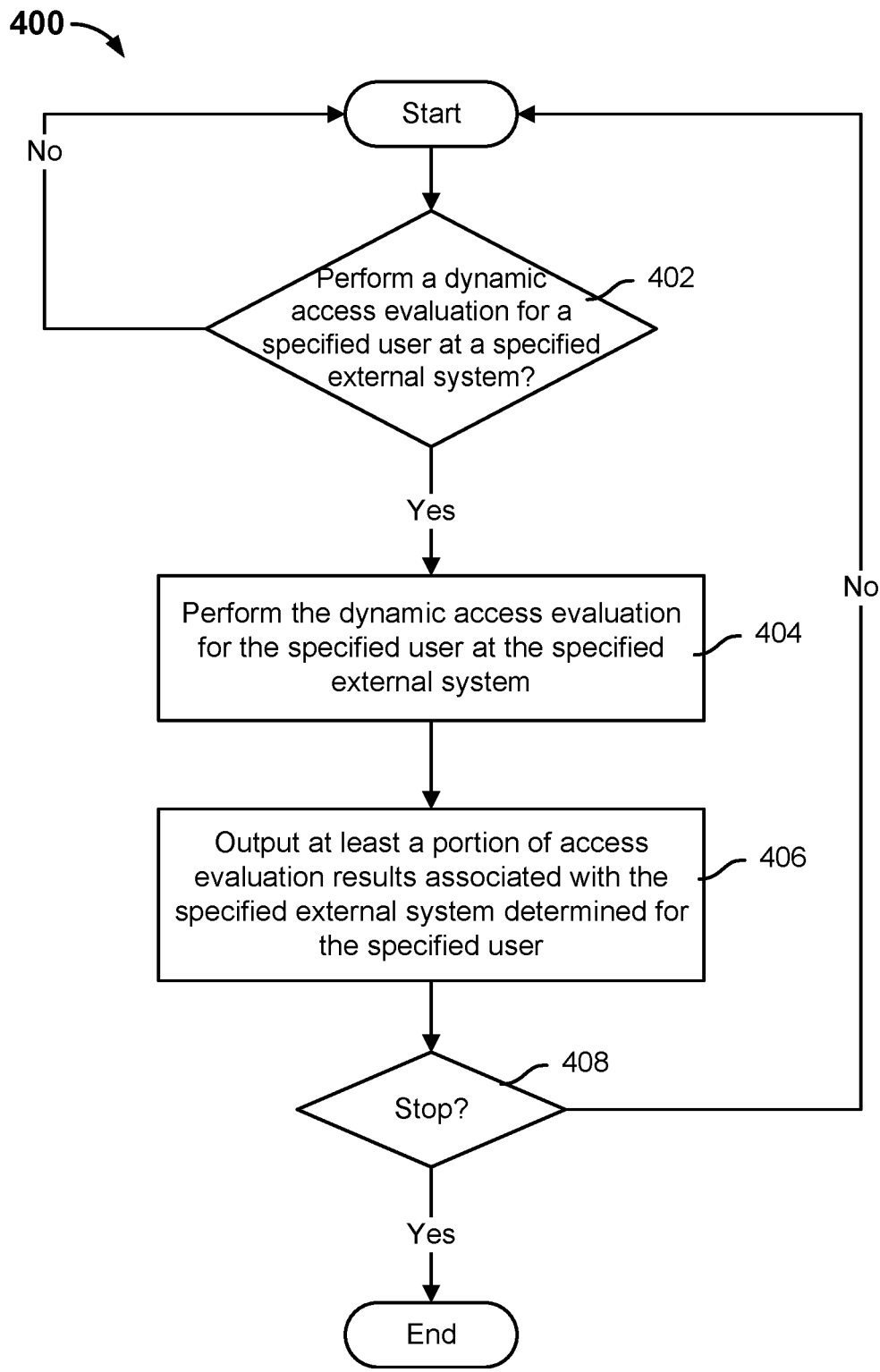
FIG. 4 is a flow diagram showing an example process for repeated performance of dynamic access evaluation for a specified user at a specified external system.

FIG. 4 is a flow diagram showing an example process for repeated performance of dynamic access evaluation for a specified user at a specified external system. In some embodiments, process 400 is implemented by a data store access evaluation server such as data store access evaluation server 108 of system 100 of FIG. 1.

Process 400 is an example process for potentially repeated performance of a dynamic access evaluation for a specified user at a specified external system. Repeated performance of a dynamic access evaluation for a specified user at a specified external system can help track how that user's access at the data store of the external system changes over time and/or whether they conform with expected/desired access evaluation results (e.g., in response to updates in table ACLs and other security configurations with respect to the external system). Different instances of process 400 can be performed for the same user with respect to different external systems or be performed for different users with respect to the same external system.

At 402, whether a dynamic access evaluation should be performed for a specified user at a specified external system is determined. In the event that a dynamic access evaluation should be performed for a specified user at a specified external system, control is transferred to 404. Otherwise, in the event that a dynamic access evaluation should not be performed for a specified user at a specified external system, control is returned to 402. In some embodiments, a dynamic access evaluation for a specified user with respect to a specified external system can be triggered to be performed based on a predetermined schedule. In some embodiments, a dynamic access evaluation for a specified user with respect to a specified external system can be triggered to be performed in response to a user operation.

Figure 5:
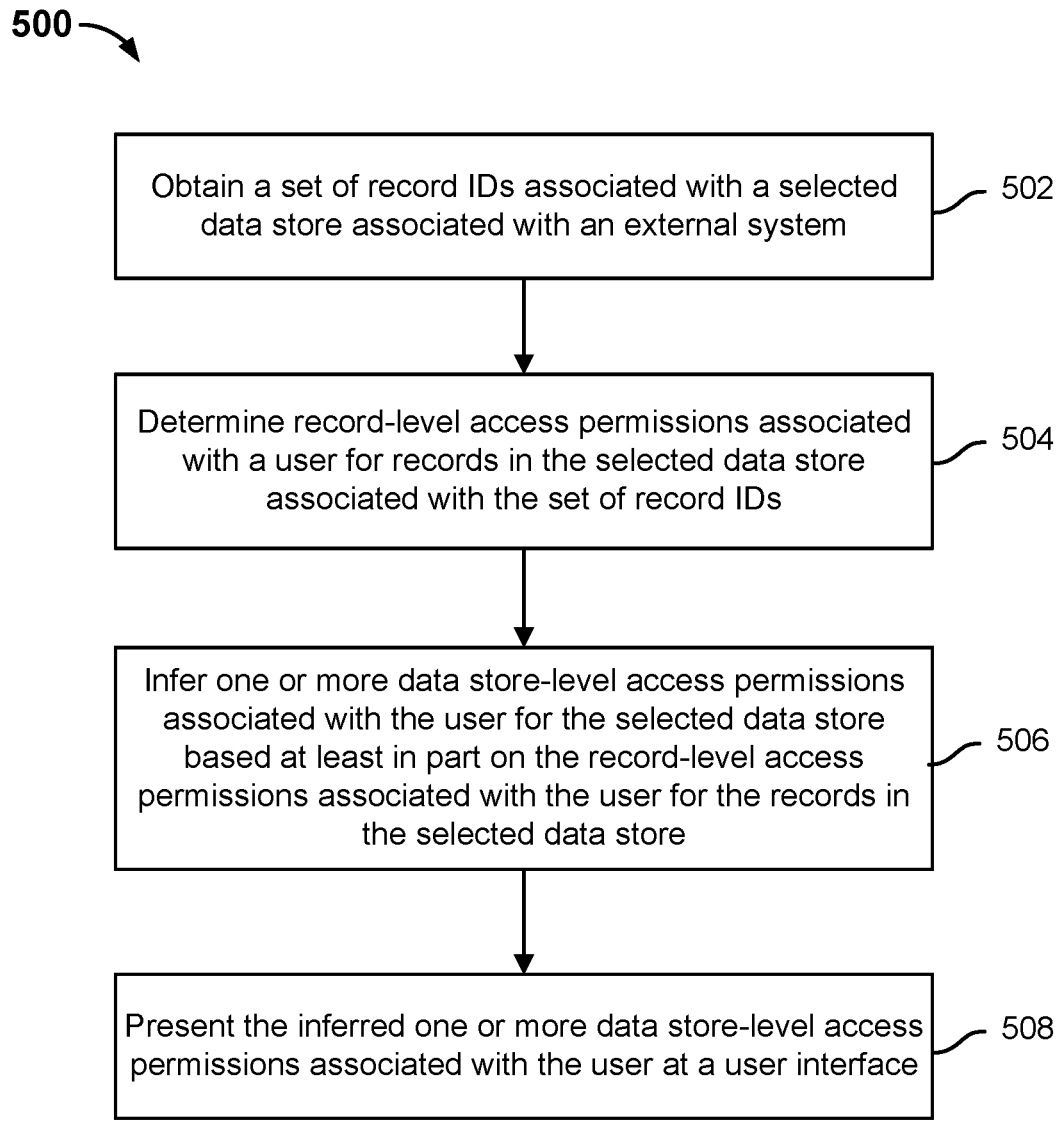
FIG. 5 is a flow diagram showing an embodiment of a process for dynamic evaluation of data store access permissions.

At 404, the dynamic access evaluation is performed for the specified user at the specified external system. In various embodiments, performing the dynamic access evaluation for the specified user at the specified external system involves selecting a data store (e.g., set of tables) at the specified external system and determining the user's record-level access permissions for at least a subset of records associated with the set of tables. Then, the user's record-level access permissions for at least a subset of records associated with the set of tables are used to infer the user's access permissions with respect to each entire table of the set of tables and its fields. FIG. 5, below, describes an embodiment of a process for performing the dynamic access evaluation for the specified user at the specified external system.

Returning to FIG. 4, at 406, at least a portion of access evaluation results associated with the specified external system determined for the specified user is output. At least the user's determined access permissions with respect to each entire table of the set of tables can be presented at a user interface.

At 408, whether the dynamic access evaluation for the specified user at the specified external system should no longer be performed is determined. In the event that the dynamic access evaluation for the specified user at the specified external system should no longer be performed, process 400 ends. Otherwise, in the event that the dynamic access evaluation for the specified user at the specified external system should continue to be performed, control is returned to 402. For example, the dynamic access evaluation for the specified user at the specified external system should no longer be performed in the event that the user is no longer associated with the organization.

FIG. 5 is a flow diagram showing an embodiment of a process for dynamic evaluation of data store access permissions. In some embodiments, process 500 is implemented by a data store access evaluation server such as data store access evaluation server 108 of system 100 of FIG. 1. In some embodiments, step 404 of process 400 of FIG. 4 can be implemented, at least in part, by process 500.

At 502, a set of record IDs associated with a selected data store associated with an external system is obtained. In some embodiments, a set of records associated with a data store associated with an external system is selected to use to determine a specified user's access permissions with respect to the data store. In some embodiments, the data store associated with the external system comprises a set of tables or other data structures. In some embodiments, the number of records that is selected is a dynamic number that is determined based on the size of the tables (e.g., the total number of records within the table(s)) and/or historical dynamic access evaluation results that had been determined for the same specified user or for a different user.

In some embodiments, the set of records is determined by instructing the record IDs of the records in the set of tables to be sorted at the external system and then selecting at least a portion of the records based on the sorted record IDs. In some embodiments, the set of records is determined by parsing through a set of audit logs that are obtained from the external system, where the audit logs recorded the external system's historical grants and/or denials of actual user access requests to records identified by their record IDs. The audit logs can be selected based on their at least including the user ID of the specified user and/or recordings of access requests to the tables of the set of tables.

At 504, record-level access permissions associated with a user for records in the selected data store associated with the set of record IDs are determined. Whether the user can perform each of one or more types of access requests (e.g., read request, write request, and/or delete request) is determined on the record-level for each record identified within the set of record IDs. In some embodiments, whether the user can perform each of one or more types of access requests on the record-level is determined for each record by making an API call to an impersonation function at the external system to test whether the specified user (as identified by the user's user ID) can perform a given access request (e.g., read request, write request, and/or delete request) to that record as identified by its record ID. In some embodiments, whether the user can perform each of one or more types of access requests on the record-level is determined for each record by parsing through the audit logs to check the recorded external system's denial or grants of the specified user's historical access request at each record-level.

In some embodiments, in addition to determining the user's record-level access permissions, whether the user can perform each of one or more types of access requests (e.g., read request and/or write request) is determined on the field-level of each field that is included in each record identified within the set of record IDs. In some embodiments, whether the user can perform each of one or more types of access requests (e.g., read request and/or write request) on the field-level of each field that is included in each record identified within the set of record IDs is determined by making an API call to the impersonation function at the external system and by identifying, for example, the user's user ID, the record ID, the field ID, and/or the type of access request in question. In some embodiments, whether the user can perform each of one or more types of access requests (e.g., read request and/or write request) on the field-level of each field that is included in each record identified within the set of record IDs is determined by parsing through the audit logs to check the recorded external system's denial or grants of the specified user's historical access request at each field-level.

At 506, one or more data store-level access permissions associated with the user for the selected data store are inferred based at least in part on the record-level access permissions associated with the user for the records in the selected data store. The user's record-level access permissions for a given access type (e.g., read request, write request, and/or delete request) are used to infer that user's access permission for that given access type for the entire data store. In some embodiments, where the data store comprises a set of tables, the user's record-level access permissions for a given access type (e.g., read request, write request, and/or delete request) corresponding to records of the same table are used to infer that user's access permission for that given access type for that entire table.

At 508, the inferred one or more data store-level access permissions associated with the user are presented at a user interface. The one or more data store-level access permissions associated with the user are evaluation results. In some embodiments, the record-level and/or field-level access permissions determined for the user are also, at least in part, presented at the user interface. In some embodiments, one or more recommended actions and/or interactive elements to programmatically perform an adjustment in security configuration (e.g., at the external system) are also presented at the user interface with the evaluation results.

Figure 6:
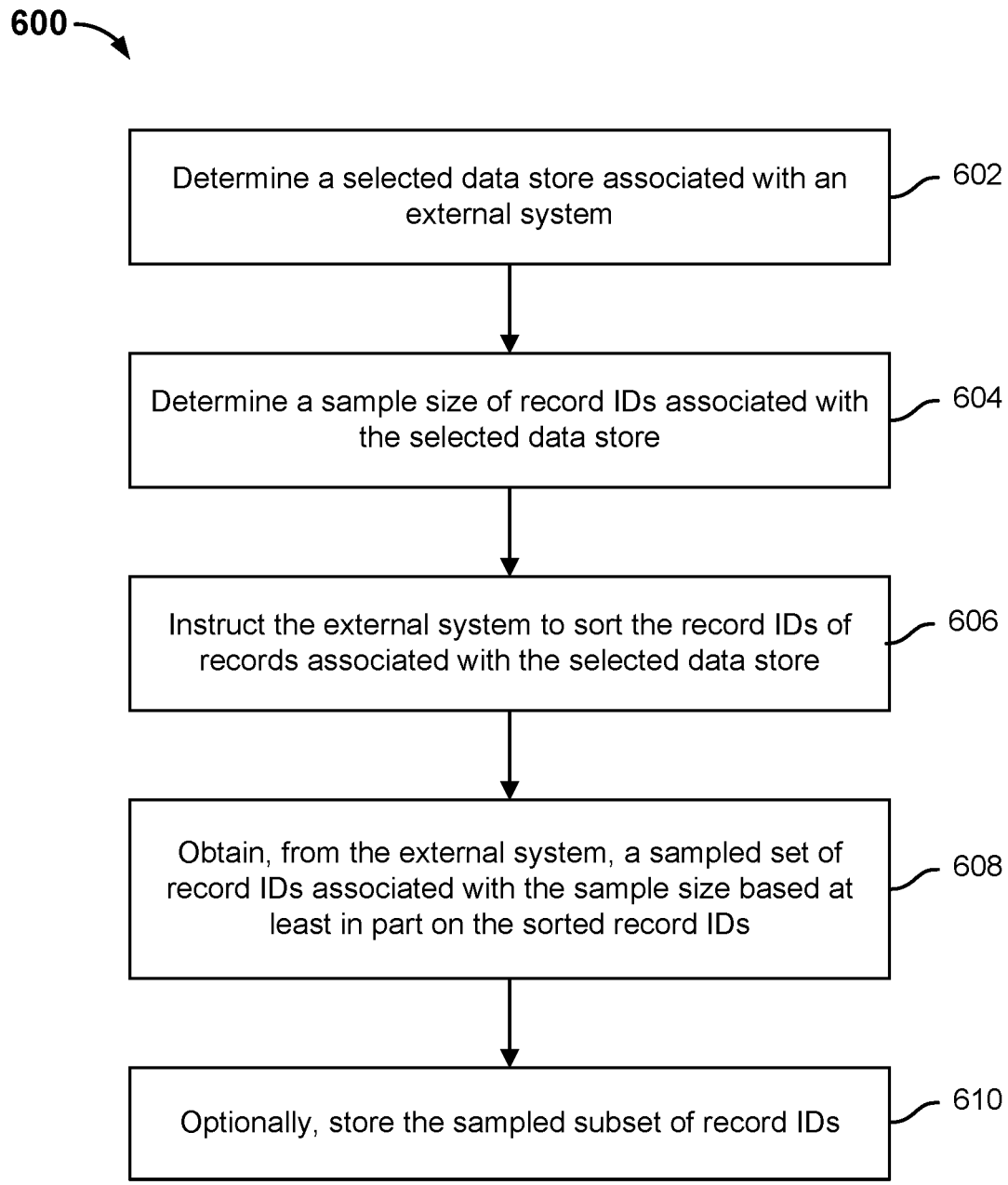
FIG. 6 is a flow diagram showing an example of a process for obtaining a set of record IDs to be used to perform a dynamic evaluation of data store-level access permissions for a specified user associated with an organization.

FIG. 6 is a flow diagram showing an example of a process for obtaining a set of record IDs to be used to perform a dynamic evaluation of data store-level access permissions for a specified user associated with an organization. In some embodiments, process 600 is implemented by a data store access evaluation server such as data store access evaluation server 108 of system 100 of FIG. 1. In some embodiments, step 502 of process 500 of FIG. 5 can be implemented, at least in part, by process 600.

At 602, a selected data store associated with an external system is determined. In some embodiments, the data store associated with the external system that is to be used to perform a dynamic evaluation of data store-level access permissions for a specified user associated with an organization includes a selected set of tables (or other data structures). The tables may be selected based on heuristics and/or based on their having been custom-created by the organization.

At 604, a sample size of record IDs associated with the selected data store is determined. In some embodiments, the number of records that is selected is a dynamic number that is determined based on the size of the tables (e.g., the total number of records within the table(s)) and/or historical dynamic access evaluation results that had been determined for the same specified user or for a different user. In some embodiments, the number of records that is selected is a dynamic number that is also determined based on the expected time within which the evaluation results are expected to be output at a user interface. For example, if the evaluation is performed in real-time in response to a user operation, then the sample size can be determined to be smaller to minimize the time it takes to perform the analysis. But if the evaluation is performed based on a schedule, then the sample size can be determined to be larger to increase the accuracy of the inference results.

At 606, the external system is instructed to sort the record IDs of records associated with the selected data store. The external system is instructed to sort only the record IDs of the records included in the selected set of tables associated with the external system. For example, the record IDs can be sorted by largest to smallest or from smallest to largest.

At 608, a sampled set of record IDs associated with the sample size is obtained from the external system based at least in part on the sorted record IDs. The sample size of record IDs is determined based on the sorted list of record IDs. For example, if the sample size were determined to be K (e.g., K=1,000), then the K records can be selected from the middle of the sorted list, the highest record IDs end of the sorted list, or the lowest record IDs end of the sorted list.

In some embodiments, prior to obtaining the sample set of record IDs, certain records are filtered out from consideration due to their matching predetermined user characteristics, record characteristics, and/or other known constraints.

At 610, optionally, the sampled subset of records IDs is stored. In some embodiments, only the sample record IDs (and not other data associated with the records that they reference) are stored at the data store access evaluation server so that they can be used to identify the records for which the user's access permissions are to be determined. In some embodiments, the sampled record IDs can also be stored somewhere else instead of the data store access evaluation server (e.g., if the organization did want to store any record-related information at the data store access evaluation server due to its perceived sensitivity).

FIGS. 7A, B, and C show an example of determining a set of record IDs associated with records to be used to perform a dynamic evaluation of data store-level access permissions for a specified user associated with an organization. The example process described across FIGS. 7A, B, and C can be implemented using process 600 of FIG. 6.

FIG. 7A shows an example table ("Table_Employee") that is stored at an external system for an organization. As shown in FIG. 7A, Table_Employee stores records of employee related data in fields including, at least, "Record ID" (the record's ID), "Time" (the timestamp associated with when the record was generated), "First Name" (the employee's first name), and "Last Name" (the employee's last name). For example, record 702 includes, at least, a record ID of "8556," a time of "2019 Apr. 3," a first name of "First_Name_G," and a last name of "Last_Name_Y." As mentioned above, the external system generates unique record IDs for records but not necessarily in a (e.g., monotonically increasing) sequential manner. Assume that in the example that is described across FIGS. 7A, B, and C, Table_Employee has been selected on which to determine the specified user's table-level access. As shown in FIG. 7A, the record IDs have not yet been sorted.

FIG. 7B shows an example of at least some record IDs from Table_Employee in a sorted list. In the example of FIG. 7B, the record IDs of the records shown in Table_Employee as depicted in FIG. 7A have been sorted at the external system from lowest to highest (in other examples, the record IDs can also be sorted from highest to lowest). In the example described across FIGS. 7A, B, and C, the number of record IDs that have been determined to be sampled is 8 and they are to be selected from the lowest end of the sorted record IDs.

FIG. 7C shows the sampled set of sorted record IDs from Table_Employee. The sampled set of record IDs include: 0007, 0023, 0075, 0098, 0134, 0203, 0365, and 0401. Because the record IDs of records do not correlate with when the corresponding records have been created, the sorted list of record IDs do not form a list of records that have been created in chronological or reverse chronological order. As a result, the records associated with the sampled set of sorted record IDs form a random subset of records from Table_Employee. In some embodiments, the sampled set of record IDs can be stored locally at the data store access evaluation server. In some other embodiments, the sampled set of record IDs can be stored remote from the data store access evaluation server (e.g., if the record IDs are considered by the organization to be sensitive information) but are otherwise accessible by the data store access evaluation server. In accordance with some embodiments described herein, each record ID is to be used by the data store access evaluation server to query (e.g., via the impersonation function available at) the external system whether the specified user (as identified by that user's user ID) can perform one or more access types on a record associated with that record ID and/or on a field included in the record associated with that record ID.

FIG. 8 is a diagram showing an example of a child table that inherits fields from a parent table. In the example of FIG. 8, Table_Employee_Department is a table that inherits the two field IDs in its third and fourth columns from the left from another table, Table_Employee, such as the one shown in FIG. 7A. Therefore, Table_Employee_Department is considered a "child" table relative to the parent table of Table_Employee. In some embodiments and as shown in FIG. 8, while Table_Employee_Department does not inherit/copy/clone/reproduce field values/record data from the parent table (Table_Employee), the two field IDs in the third and fourth columns of Table_Employee_Department store references ("#ref1_Table_Employee" and "#ref2_Table_Employee") to respective field IDs "First Name" and "Last Name" from the parent table of Table_Employee. (While not shown in FIG. 8, in some embodiments, a child table can inherit not only the field IDs of one or more fields from a parent table but the child table can also inherit the field values of those fields from the parent table). In some embodiments, the inherited fields in the third and fourth columns of Table_Employee_Department also store the record IDs within the parent table to be referenced. In addition to the two inherited field IDs in the third and fourth columns, Table_Employee_Department also stores field IDs "Record ID" and "Time" as well as "Department" (the department within an organization in which an employee works), which is a field ID that the parent table does not include. In some embodiments, the data store access evaluation server determines and stores parent-child table relationships (e.g., the stored field IDs and stored record IDs of a parent table from which a child table inherits) such as the one described in FIG. 8 between child table Table_Employee_Department (as shown in FIG. 8) and parent table Table_Employee (as shown in FIG. 7A). In accordance with some embodiments described herein, the stored parent-child table relationship between child table Table_Employee_Department (as shown in FIG. 8) and parent table Table_Employee (as shown in FIG. 7A) can be used to determine a specified user's access permissions to a field value in either of the inherited third or fourth column field IDs of child table Table_Employee_Department by using the stored parent-child table relationship to traverse back to parent table Table_Employee to determine security configurations (e.g., ACLs) associated with the field IDs "First Name" and "Last Name" from the parent table of Table_Employee.

Figure 9:
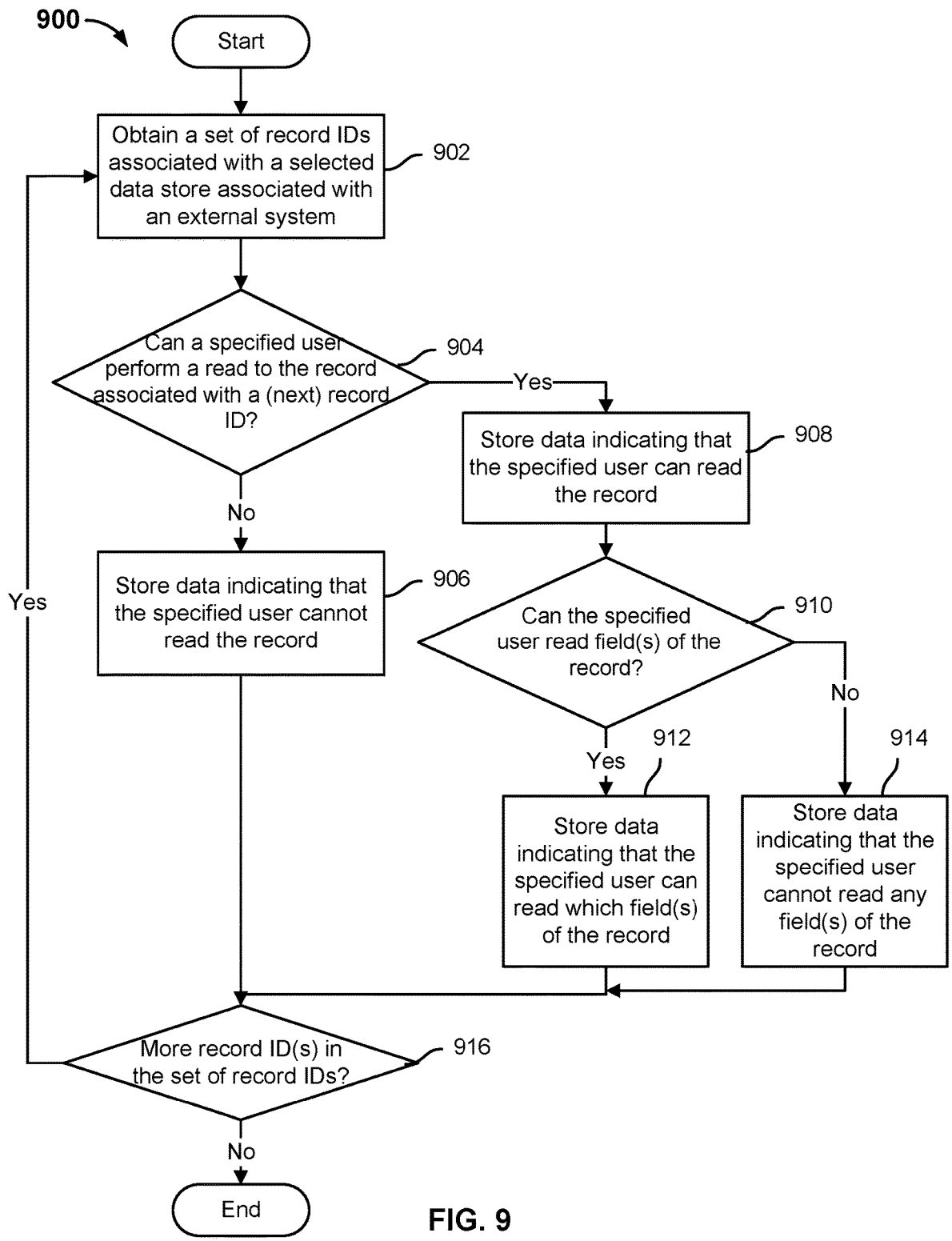
FIG. 9 is a flow diagram showing an example of a process for determining a specified user's record-level read permissions with respect to records identified by a set of record IDs.

FIG. 9 is a flow diagram showing an example of a process for determining a specified user's record-level read permissions with respect to records identified by a set of record IDs. In some embodiments, process 900 is implemented by a data store access evaluation server such as data store access evaluation server 108 of system 100 of FIG. 1. In some embodiments, step 504 of process 500 of FIG. 5 can be implemented, at least in part, by process 900.

Process 900 describes a process by which each record identified by a set of record IDs that has been selected for a specified user is checked to determine whether the user can perform a "read request" to that record, at the record-level. If the user is determined to be able to perform a read request to that record at the record-level, then it is determined whether the user can perform a read request to each field within that record.

At 902, a set of records IDs associated with a selected data store associated with an external system is obtained. For example, the set of record IDs from an external system that has been selected for a specified user to use to determine that user's dynamic access evaluation can be selected using a process such as process 600 of FIG. 6, as described above.

At 904, whether a specified user can perform a read to the record associated with a (next) record ID is determined. In the event that the specified user can perform a read request to the record associated with the (next) record, control is transferred to 908. Otherwise, in the event that the specified user cannot perform a read request to the record associated with the (next) record ID, control is transferred to 906.

In some embodiments, whether the specified user can perform a read request to the record associated with the record ID is determined by making an API call to the external system to use an impersonation function at the external system to test whether the specified user is permitted (e.g., based on the existing ACLs or other security configurations of the table with which the record is located) to perform the read request to that entire record. For example, at least the user ID, the record ID, and the read type of request are passed as parameters to the impersonation function. For example, the impersonation function will return whether the specified user's read request to that entire record would be granted/permitted or denied (e.g., based on the existing ACLs or other security configurations of the table with which the record is located).

In some embodiments, where the set of record IDs is determined by parsing through audit logs obtained from the external system, whether the specified user can perform a read request to the record associated with the record ID is determined by parsing through the audit logs to determine the recorded historical grant or denial of a read request to that entire record.

At 906, data indicating that the specified user cannot read the record is stored.

At 908, data indicating that the specified user can read the record is stored.

For example, if the user has read permission to the record, a "true" value is stored corresponding to that record and if the user does not have read permission to the record, a "false" value is stored corresponding to that record.

At 910, whether the specified user can read field(s) of the record is determined.

In the event that the specified user can read field(s) of the record, control is transferred to 912.

Otherwise, in the event that the specified user cannot read field(s) of the record, control is transferred to 914.

If the specified user has been determined to be able to have read permission to the record, then it is further checked which fields, if any, of the record, the user can perform corresponding read requests to.

In some embodiments, whether the specified user can perform a read request to each individual field value of the record associated with the record ID is determined by making an API call to the external system to use an impersonation function at the external system to test whether the specified user is permitted (e.g., based on the existing ACLs or other security configurations of the table with which the record is located) to perform the read request to that particular field of the record. For example, at least the user ID, the record ID, the field ID, and the read type of request are passed as parameters to the impersonation function. For example, the impersonation function will return whether the specified user's read request to that field of that record would be granted/permitted or denied (e.g., based on the existing ACLs or other security configurations of the table with which the record is located). In some embodiments, in the event that the external system provides the impersonation function but does not programmatically traverse from a child table to its parent table based on an inherited field ID in the child table, the data store access evaluation server can use the stored parent-child table relationships to refer back to the referenced field ID in the parent table from the reference to that field ID in the child table that stores the record to determine whether the user has read permission to a field of that record. Referring back to the example child table (Table_Employee_Department) shown in FIG. 8 to determine whether the specified user can perform a read to the field value in a record in the third column from the left, which is associated with an inherited field ID ("#ref1_Table_Employee") that references the field ID ("First Name") of the parent table, the data store access evaluation server can use the stored parent-child table relationships to locate the parent table (Table_Employee) at the external system and then evaluate, using the impersonation function, whether the user can access the field value in the third column given the security configurations (e.g., ACLs) associated with the parent table.

In some embodiments, where the set of record IDs is determined by parsing through audit logs obtained from the external system, whether the specified user can perform a read request to each individual field value of the record associated with the record ID is determined by parsing through the audit logs to determine the recorded historical grant or denial of a read request to that field of that record.

If the specified user has been determined to be able to not have read permission to the record, then it is assumed that the user also does not have read permission to any fields within that record and therefore, it is not further checked which fields, if any, of the record, the user can perform corresponding read requests to.

At 912, data indicating that the specified user can read which field(s) in the record is stored.

At 914, data indicating that the specified user cannot read any fields in the record is stored.

For example, if the user has read permission to a field in the record, a "true" value is stored corresponding to that field of that record and if the user does not have read permission to the field in the record, a "false" value is stored corresponding to that field of that record.

At 916, whether there is at least one more record ID in the set of record IDs is determined. In the event that there is at least one more record ID in the set of record IDs, control is returned to 902. Otherwise, in the event that there are no more record IDs in the set of record IDs, process 900 ends.

Figure 10:
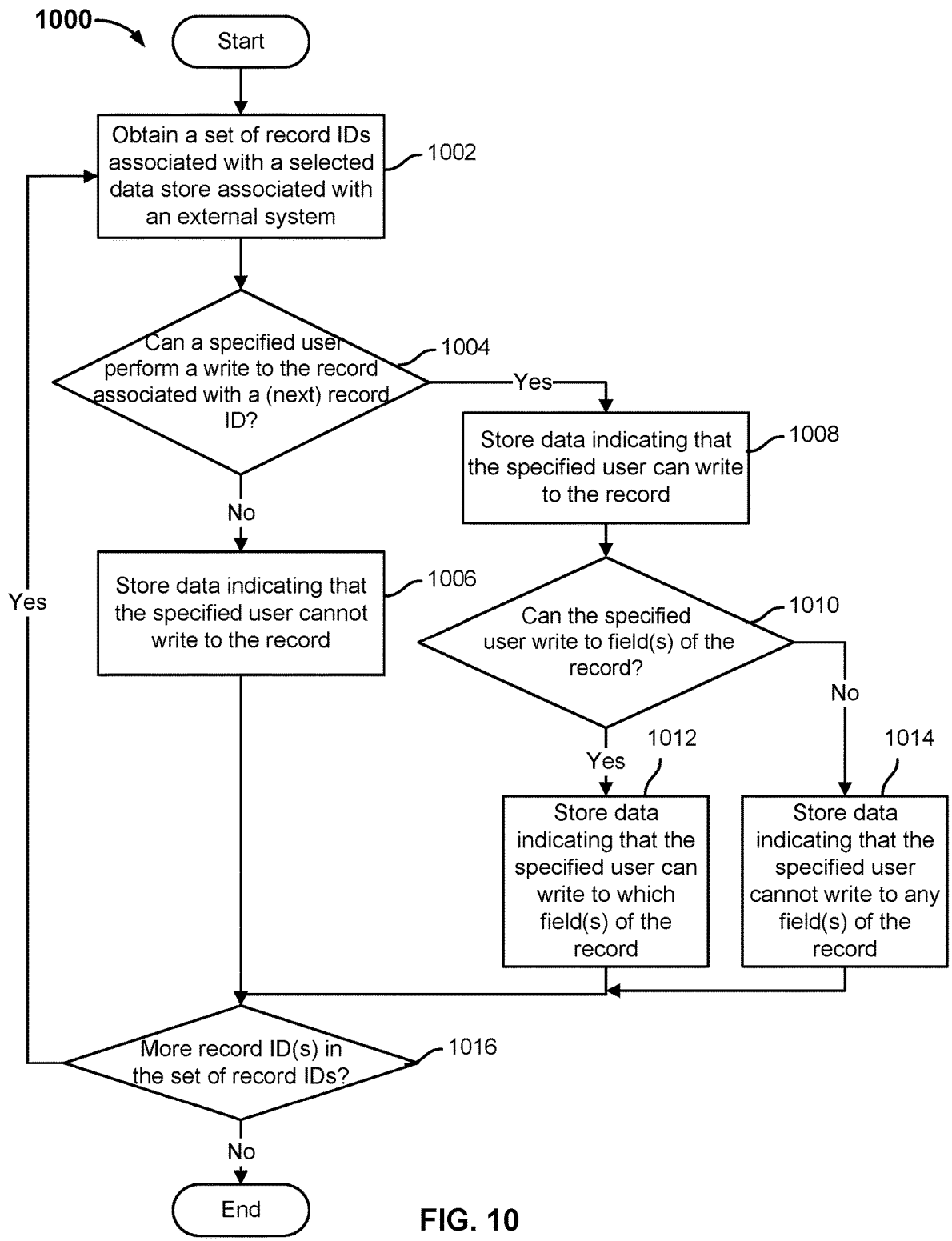
FIG. 10 is a flow diagram showing an example of a process for determining a specified user's record-level write permissions with respect to records identified by a set of record IDs.

FIG. 10 is a flow diagram showing an example of a process for determining a specified user's record-level write permissions with respect to records identified by a set of record IDs. In some embodiments, process 1000 is implemented by a data store access evaluation server such as data store access evaluation server 108 of system 100 of FIG. 1. In some embodiments, step 504 of process 500 of FIG. 5 can be implemented, at least in part, by process 1000.

Process 1000 is similar to process 900 of FIG. 9 except that process 1000 describes a process by which each record identified by a set of record IDs that has been selected for a specified user is checked to determine whether the user can perform a "write request" to that record, at the record-level. If the user is determined to be able to perform a write request to that record at the record-level, then it is determined whether the user can perform a write request to each field within that record.

At 1002, a set of records IDs associated with a selected data store associated with an external system is obtained. For example, the set of record IDs from an external system that has been selected for a specified user to use to determine that user's dynamic access evaluation can be selected using a process such as process 600 of FIG. 6, as described above.

At 1004, whether a specified user can perform a write to the record associated with a (next) record ID is determined. In the event that the specified user can perform a write request to the record associated with the (next) record, control is transferred to 1008. Otherwise, in the event that the specified user cannot perform a write request to the record associated with the (next) record ID, control is transferred to 1006.

In some embodiments, whether the specified user can perform a write request to the record associated with the record ID is determined by making an API call to the external system to use an impersonation function at the external system to test whether the specified user is permitted (e.g., based on the existing ACLs or other security configurations of the table with which the record is located) to perform the write request to that entire record. For example, at least the user ID, the record ID, and the write type of request are passed as parameters to the impersonation function. For example, the impersonation function will return whether the specified user's write request to that entire record would be granted/permitted or denied (e.g., based on the existing ACLs or other security configurations of the table with which the record is located).

In some embodiments, where the set of record IDs is determined by parsing through audit logs obtained from the external system, whether the specified user can perform a write request to the record associated with the record ID is determined by parsing through the audit logs to determine the recorded historical grant or denial of a write request to that entire record.

At 1006, data indicating that the specified user cannot write to the record is stored.

At 1008, data indicating that the specified user can write to the record is stored.

For example, if the user has write permission to the record, a "true" value is stored corresponding to that record and if the user does not have write permission to the record, a "false" value is stored corresponding to that record.

At 1010, whether the specified user can write to field(s) of the record is determined. In the event that the specified user can write to field(s) of the record, control is transferred to 1012. Otherwise, in the event that the specified user cannot write to field(s) of the record, control is transferred to 1014.

If the specified user has been determined to be able to have write permission to the record, then it is further checked which fields, if any, of the record, the user can perform corresponding write requests to.

In some embodiments, whether the specified user can perform a write request to each individual field value of the record associated with the record ID is determined by making an API call to the external system to use an impersonation function at the external system to test whether the specified user is permitted (e.g., based on the existing ACLs or other security configurations of the table with which the record is located) to perform the write request to that particular field of the record. For example, at least the user ID, the record ID, the field ID, and the write type of request are passed as parameters to the impersonation function. For example, the impersonation function will return whether the specified user's write request to that field of that record would be granted/permitted or denied (e.g., based on the existing ACLs or other security configurations of the table with which the record is located). In some embodiments, in the event that the external system provides the impersonation function but does not programmatically traverse from a child table to its parent table based on an inherited field ID in the child table, the data store access evaluation server can use the stored parent-child table relationships to refer back to the referenced field ID in the parent table from the reference to that field ID in the child table that stores the record to determine whether the user has write permission to a field of that record. Referring back to the example child table ("Table_Employee_Department") shown in FIG. 8 to determine whether the specified user can perform a write request to the field value in a record in the third column from the left, which is associated with an inherited field ID ("#ref1_Table_Employee") that references the field ID ("First Name") of the parent table, the data store access evaluation server can use the stored parent-child table relationships to locate the parent table at the external system and then evaluate, using the impersonation function, whether the user can access the field value in the third column given the security configurations (e.g., ACLs) associated with the parent table.

In some embodiments, where the set of record IDs is determined by parsing through audit logs obtained from the external system, whether the specified user can perform a write request to each individual field value of the record associated with the record ID is determined by parsing through the audit logs to determine the recorded historical grant or denial of a write request to that field of that record.

If the specified user has been determined to be able to not have write permission to the record, then it is assumed that the user also does not have write permission to any fields within that record and therefore, it is not further checked which fields, if any, of the record, the user can perform corresponding write requests to.

At 1012, data indicating that the specified user can write to which field(s) in the record is stored.

At 1014, data indicating that the specified user cannot write to any fields in the record is stored.

For example, if the user has write permission to a field in the record, a "true" value is stored corresponding to that field of that record and if the user does not have write permission to the field in the record, a "false" value is stored corresponding to that field of that record.

At 1016, whether there is at least one more record ID in the set of record IDs is determined. In the event that there is at least one more record ID in the set of record IDs, control is returned to 1002. Otherwise, in the event that there are no more record IDs in the set of record IDs, process 1000 ends.

Figure 11:
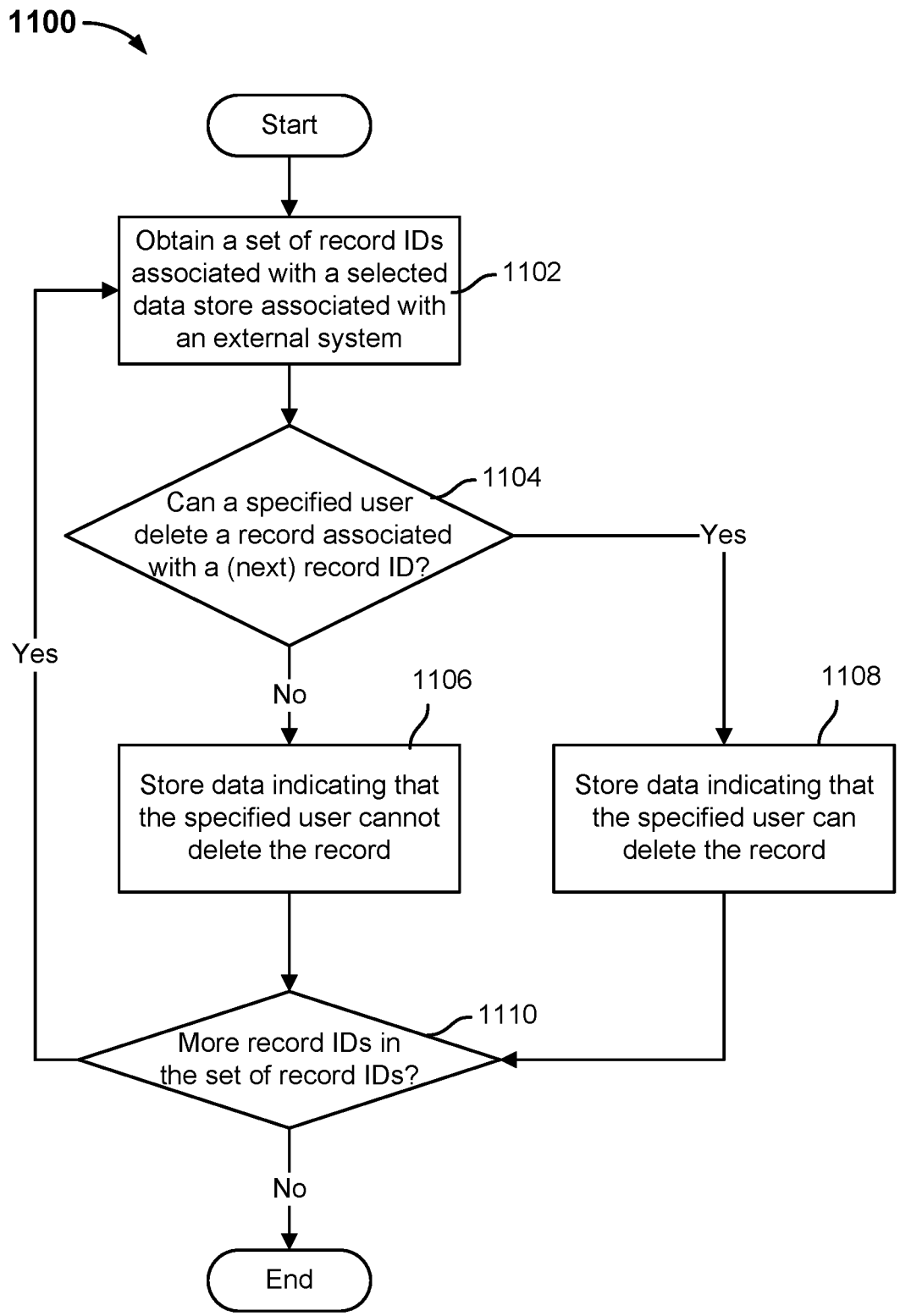
FIG. 11 is a flow diagram showing an example of a process for determining a specified user's record-level delete permissions with respect to records identified by a set of record IDs.

FIG. 11 is a flow diagram showing an example of a process for determining a specified user's record-level delete permissions with respect to records identified by a set of record IDs. In some embodiments, process 1100 is implemented by a data store access evaluation server such as data store access evaluation server 108 of system 100 of FIG. 1. In some embodiments, step 504 of process 500 of FIG. 5 can be implemented, at least in part, by process 1100.

Process 1100 is similar to process 900 of FIG. 9 and process 1000 of FIG. 10 except that process 1100 describes a process by which each record identified by a set of record IDs that has been selected for a specified user is checked to determine whether the user can perform a "delete" equest" to that record, at the record-level. Unlike process 900 of FIG. 9 and process 1000 of FIG. 10, in process 1100, if the user is determined to be able to perform a delete request to that record at the record-level, it is not determined whether the user can perform a delete request to each field within that record.

At 1102, a set of records IDs associated with a selected data store associated with an external system is obtained. For example, the set of record IDs from an external system that has been selected for a specified user to use to determine that user's dynamic access evaluation can be selected using a process such as process 600 of FIG. 6, as described above.

At 1104, whether a specified user can perform a delete request to the record associated with a (next) record ID is determined. In the event that the specified user can perform a delete request to the record associated with the (next) record, control is transferred to 1108. Otherwise, in the event that the specified user cannot perform a delete request to the record associated with the (next) record ID, control is transferred to 1106.

In some embodiments, whether the specified user can perform a delete request to the record associated with the record ID is determined by making an API call to the external system to use an impersonation function at the external system to test whether the specified user is permitted (e.g., based on the existing ACLs or other security configurations of the table with which the record is located) to perform the delete request to that entire record. For example, at least the user ID, the record ID, and the delete type of request are passed as parameters to the impersonation function. For example, the impersonation function will return whether the specified user's delete request to that entire record would be granted/permitted or denied (e.g., based on the existing ACLs or other security configurations of the table with which the record is located).

In some embodiments, where the set of record IDs is determined by parsing through audit logs obtained from the external system, whether the specified user can perform a delete request to the record associated with the record ID is determined by parsing through the audit logs to determine the recorded historical grant or denial of a delete request to that entire record.

At 1106, data indicating that the specified user cannot delete the record is stored.

At 1108, data indicating that the specified user can delete the record is stored.

For example, if the user has delete permission for the record, a "true" value is stored corresponding to that record and if the user does not have delete permission for the record, a "false" value is stored corresponding to that record.

At 1110, whether there is at least one more record ID in the set of record IDs is determined. In the event that there is at least one more record ID in the set of record IDs, control is returned to 1102. Otherwise, in the event that there are no more record IDs in the set of record IDs, process 1100 ends.

FIG. 12 is a diagram showing example access evaluation results that have been determined for a specified user for read type accesses. Referring back to the example of selecting record IDs as described in FIGS. 7A, B, and C in which eight record IDs were selected from the "Table_Employee," assume that a specified user's read permissions to each of the records identified by the eight record IDs had been determined using a process such as process 900 of FIG. 9, as described above. Table 1202 stores the user's example record-level read access evaluation results for each of the records identified by the eight record IDs, where "true" indicates that the user does have permission to read the corresponding record at the record-level and "false" indicates that the user does not have permission to read the corresponding record at the record-level. Table 1204 stores the user's example field-level read access evaluation results for each of the records identified by the eight record IDs, where "true" indicates that the user does have permission to read the corresponding field of the corresponding record at the field-level and "false" indicates that the user does not have permission to read the corresponding field of the corresponding record at the field-level. As described in process 900 of FIG. 9, in the event that the user is determined to not have read permission to a record at the record-level, then it is assumed that the user also does not have read permission to each field within that record at the field-level. As shown in the example of FIG. 12, according to table 1202, the user was determined to not have read permission to the record identified by record 0098 and therefore, the user is shown to have no read permission to any fields within the record identified as record 0098. As also described in process 900 of FIG. 9, in the event that the user is determined to have read permission to a record at the record-level, it is further checked whether the user has read permission to each field within that record at the field-level. As shown in the example of FIG. 12, according to table 1202, the user was determined to have read permission to the record identified by record 0023 and therefore, it is further checked whether the user has read permission to each field within the record identified by record 0023. As shown in table 1204, the user has been determined to have read permission to at least the fields of "Time," "First_Name," and "Last_Name" within the record identified by record 0023.

In some embodiments, at least a portion of tables 1202 and/or 1204 can be presented at a user interface as part of access evaluation results determined for the user.

While the example access evaluation results shown in FIG. 12 describe only results for the "read" type of accesses, similar types of results can be presented at a user interface for the "write" type of accesses and for the "delete" type of accesses (except for the field-level evaluation which is not performed for "delete" requests, in accordance with some embodiments).

Figure 13:
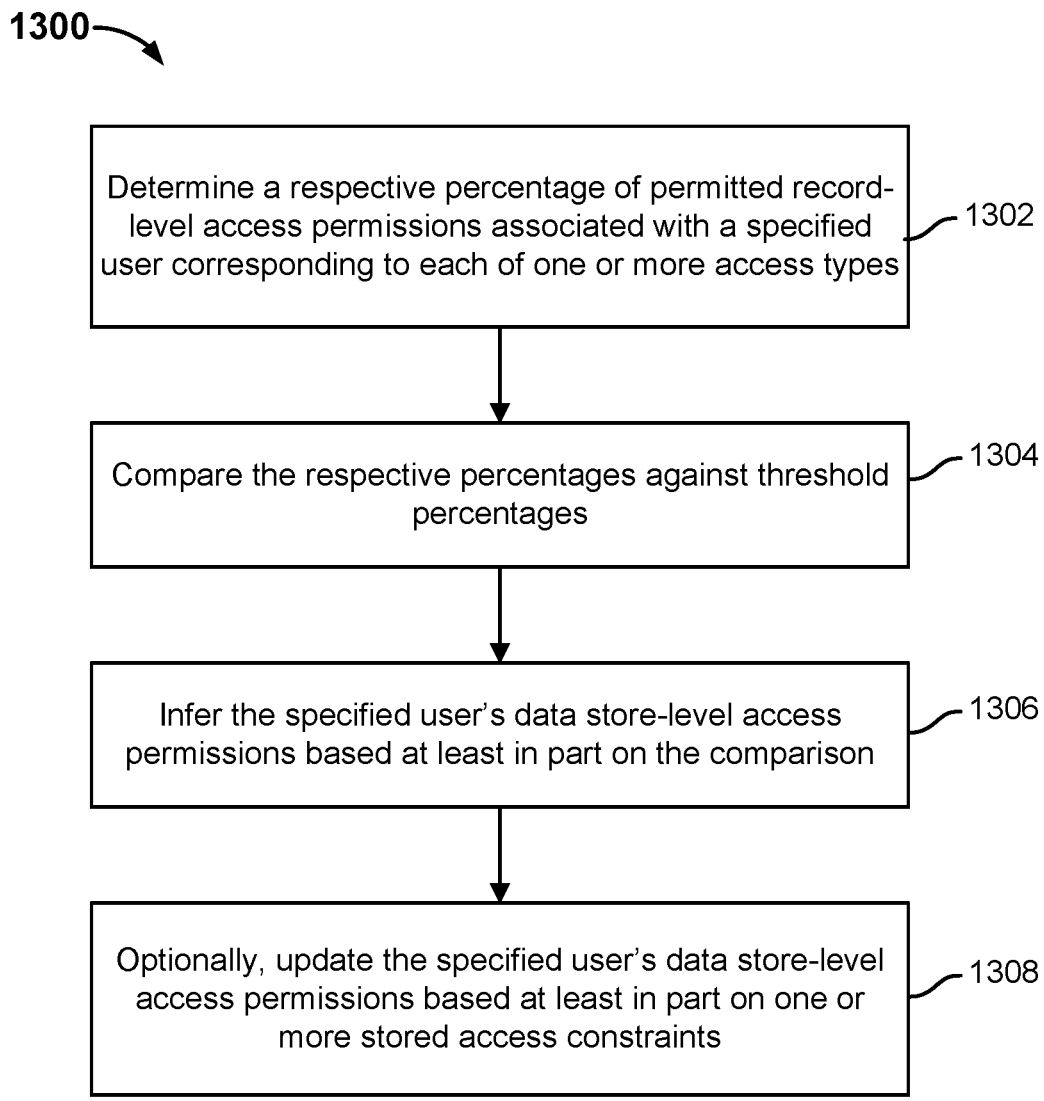
FIG. 13 is a flow diagram showing an example of a process for inferring a specified user's data store-level access permissions based on the user's record-level access permissions.

FIG. 13 is a flow diagram showing an example of a process for inferring a specified user's data store-level access permissions based on the user's record-level access permissions. In some embodiments, process 1300 is implemented by a data store access evaluation server such as data store access evaluation server 108 of system 100 of FIG. 1. In some embodiments, step 506 of process 500 of FIG. 5 can be implemented, at least in part, by process 1300.

At 1302, a respective percentage of permitted record-level access permissions associated with a specified user corresponding to each of one or more access types is determined. In some embodiments, the percentage of records for which each access type (e.g., read, write, delete) is permitted for a specified user among records identified by the selected set of record IDs is determined. In some embodiments, if the data store comprises one or more tables (or other data structures), then the percentage of records for each access type is determined based on the record-level access permissions for each table. For example, a corresponding percentage of records that User "Mike_Johnson" can read at the record-level among the records associated with the same table associated with the data store is determined, a corresponding percentage of records that User "Mike_Johnson" can write to at the record-level among the records associated with that table is determined, and a corresponding percentage of records that User "Mike_Johnson" can delete at the record-level among the records associated with that table is determined.

At 1304, the respective percentages are compared against threshold percentages. Each percentage associated with a different access type is compared against a corresponding threshold percentage. In some embodiments, the threshold percentage for each access type is dynamically determined based at least in part on the size of the table from which the records are associated and/or the size of the set of record IDs. In some embodiments, if the data store comprises two or more tables (or other data structures), then the percentage of records for each access type for each table is compared to a threshold percentage.

At 1306, the specified user's data store-level access permissions are inferred based at least in part on the comparison. In some embodiments, if the specified user's percentage of access permitted records at the record-level for a particular access type associated with a table is equal to or greater than the access type's corresponding threshold percentage, then the specified user is determined to (likely) be permitted to perform that access type for that entire table.

At 1308, optionally, the specified user's data store-level access permissions are updated based at least in part on one or more stored access constraints. In some embodiments, the specified user's inferred table-level access permissions are further restricted based on known constraints (e.g., such as custom policies, firewalls), if any, before they are presented at a user interface.

Referring to the example record-level read access permissions described in table 1202 of FIG. 12, as described above, the example user has been determined to have read permission to six of the eight records of Table_Employee. As such, the example user has read permission to (6/8=) 75% of the records in Table_Employee. If the threshold percentage for read type accesses is 70%, then the example user is determined to (likely) have read permission to the entire table of Table_Employee.

Figure 14:
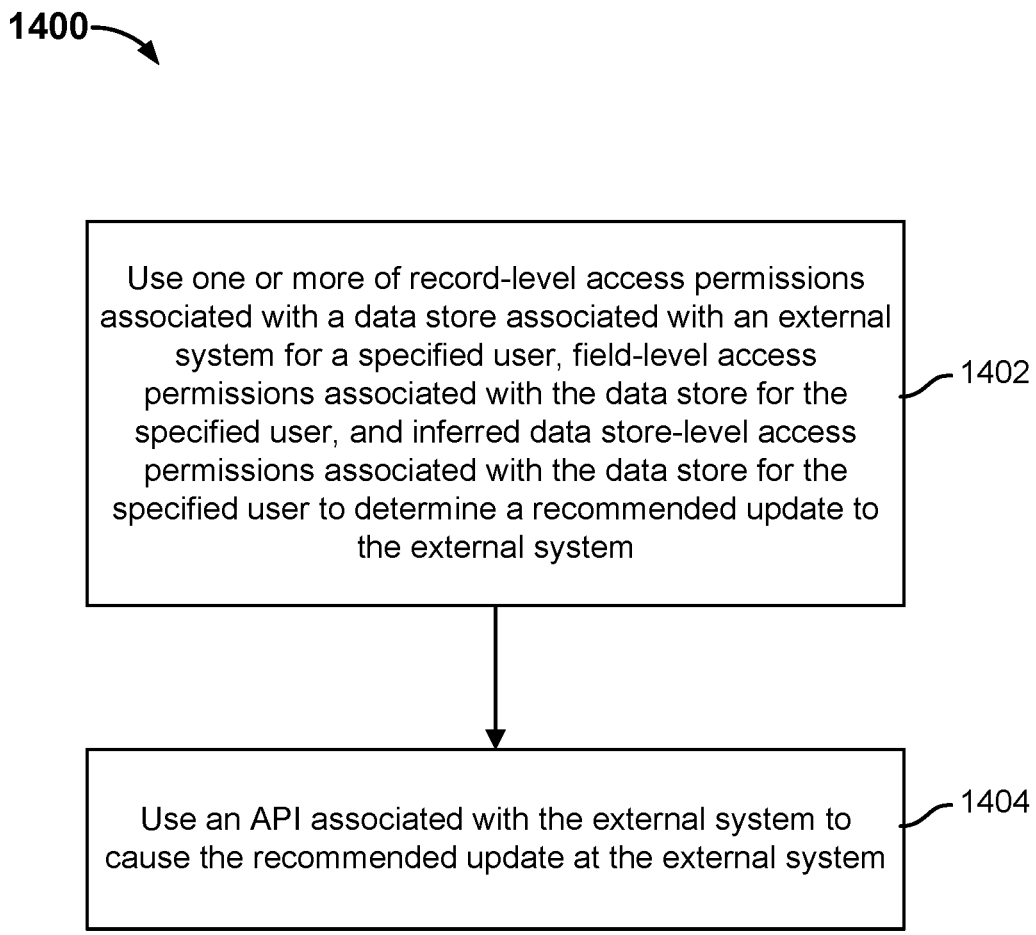
FIG. 14 is a flow diagram showing an example of a process for performing a recommended update to an external system.

FIG. 14 is a flow diagram showing an example of a process for performing a recommended update to an external system. In some embodiments, process 1400 is implemented by a data store access evaluation server such as data store access evaluation server 108 of system 100 of FIG. 1.

At 1402, one or more record-level access permissions associated with a data store associated with an external system for a specified user, field-level access permissions associated with the data store for the specified user, and inferred data store-level access permissions associated with the data store for the specified user are used to determine a recommended update to the external system. The access permissions associated with one or more access types (e.g., read, write, and/or delete) at one or more levels (e.g., the record-level, the field-level, the data store-level (e.g., including the table-level)) can be compared against one or more rules to determine whether an update to be performed at the external system is to be recommended. For example, the access permissions associated with one or more access types at one or more levels can be compared against desired access permissions corresponding to the specified user to determine whether a discrepancy is found.

At 1404, an API associated with the external system is used to cause the recommended update at the external system. In some embodiments, in the event that a discrepancy between the specified user's access permissions at one or more levels of the data store and a rule/set of desired access permissions can be programmatically eliminated, a corresponding API call to the external system is made to cause a recommended update to be performed at the external system. For example, the API call can change the ACLs or other security configurations associated with a table at the external system.

FIG. 15 is a diagram showing an example user interface at which an organization's users' dynamic access evaluation results can be presented. In some embodiments, the example user interface can be presented by a data store access evaluation server at a client device that is operated by a (e.g., a security administrator) user associated with an organization. As shown in FIG. 15, for each user ID associated with the organization, the associated user's evaluation results comprising table-level accesses of read, write, and delete are presented for each table associated with a data store at an external system, along with a recommended action, if any. For example, the user with user ID "User123" was determined to have read access permission, write access permission, but not delete access permission with respect to the "Employee" table. Furthermore, there are no recommended actions to be taken with respect to User123 at the external system. In another example, user with user ID "User047" was determined to have read access permission, write access permission, and also delete access permission with respect to the "Employee" table. In this instance, it has been determined that User047 should not be able to delete the "Employee" table at the external system and as such, link 1502 is presented in the "Recommended Actions" column for the viewing (e.g., security administrator) user to select. For example, in response to a user selection of link 1502, the data store access evaluation server is configured to programmatically send one or more API commands to the external system to update the ACLs associated with the "Employee" table such that User047 should no longer be able to delete it.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
obtain a set of record identifiers (IDs) associated with a selected data store associated with an external system, wherein the selected data store comprises a selected table, wherein the set of record IDs corresponds to a selected sample of records from the selected table;
determine record-level access permissions associated with a user for records in the selected data store associated with the set of record IDs;
infer one or more data store-level access permissions associated with the user for the selected data store based at least in part on the record-level access permissions associated with the user for the records in the selected data store, wherein the one or more data store-level access permissions comprise a table-level read access permission, wherein the table-level read access permission is inferred from record-level read access permissions associated with the user that were determined for the selected sample of records;
present the inferred one or more data store-level access permissions associated with the user at a user interface;
compare the inferred table-level read access permission associated with the user with a desired table-level access permission associated with the user;
determine a discrepancy between the inferred table-level read access permission associated with the user with the desired table-level access permission associated with the user; and
in response to the discrepancy, cause an update to be performed at the external system; and
a memory coupled to the processor and configured to provide instructions to the processor.

2. The system of claim 1, wherein the processor is further configured to:
query the external system for IDs related to tables stored at the external system;
query the external system for user IDs of users; and
store the IDs related to tables and the user IDs.

3. The system of claim 1, wherein the processor is further configured to:
search the external system for parent-child table relationships; and
store the parent-child table relationships.

4. The system of claim 1, wherein the processor is further configured to:
determine a sample size of record IDs associated with the selected data store;
instruct the external system to sort record IDs associated with the records associated with the selected data store; and
obtain, from the external system, the set of record IDs associated with the sample size based at least in part on the sorted record IDs.

5. The system of claim 4, wherein the sample size of record IDs associated with the selected data store is determined based on one or more of the following: a size associated with the selected data store, a historical access evaluation result associated with the user, and/or a type of access request associated with the record-level access permissions to be determined.

6. The system of claim 1, wherein to determine the record-level access permissions associated with the user for the records in the selected data store associated with the set of record IDs comprises to generate an application programming interface (API) call to the external system to use an impersonation function to test whether the user is permitted to perform a specified access type to a record in the selected data store associated with a record ID from the set of record IDs.

7. The system of claim 6, wherein the specified access type to the record comprises one or more of a read access, a write access, and a delete access.

8. The system of claim 6, wherein the processor is further configured to, in response to a determination that the user is permitted to perform the specified access type to the record, determine whether the user is permitted to perform the specified access type to a field within the record.

9. The system of claim 8, wherein the field is determined to be associated with a field ID that is inherited from a parent table at the external system, and wherein to determine whether the user is permitted to perform the specified access type to the field within the record comprises to use stored parent-child table relationships to locate the parent table.

10. The system of claim 1, wherein to determine the record-level access permissions associated with the user for the records in the selected data store associated with the set of record IDs comprises to parse an audit log to determine whether the user is permitted to perform a specified access type to a record in the selected data store associated with a record ID from the set of record IDs.

11. The system of claim 1, wherein to infer the one or more data store-level access permissions associated with the user for the selected data store based at least in part on the record-level access permissions associated with the user for the records in the selected data store comprises to:
determine a respective percentage of permitted record-level read access permissions from the record-level read access permissions associated with the user that were determined for the selected sample of records;
compare the respective percentage against a threshold percentage; and
infer the user's table-level read access permission based at least in part on the comparison of the respective percentage against the threshold percentage.

12. The system of claim 1, wherein the processor is further configured to:
use at least one of the record-level access permissions and the one or more data store-level access permissions associated with the user to determine the update to the external system; and
use an application programming interface (API) associated with the external system to cause the update at the external system.

13. A method, comprising:
obtaining a set of record identifiers (IDs) associated with a selected data store associated with an external system, wherein the selected data store comprises a selected table, wherein the set of record IDs corresponds to a selected sample of records from the selected table;
determining record-level access permissions associated with a user for records in the selected data store associated with the set of record IDs;
inferring one or more data store-level access permissions associated with the user for the selected data store based at least in part on the record-level access permissions associated with the user for the records in the selected data store, wherein the one or more data store-level access permissions comprise a table-level read access permission, wherein the table-level read access permission is inferred from record-level read access permissions associated with the user that were determined for the selected sample of records;
presenting the inferred one or more data store-level access permissions associated with the user at a user interface;
comparing the inferred table-level read access permission associated with the user with a desired table-level access permission associated with the user;
determining a discrepancy between the inferred table-level read access permission associated with the user with the desired table-level access permission associated with the user; and
in response to the discrepancy, causing an update to be performed at the external system.

14. The method of claim 13, further comprising:
determining a sample size of record IDs associated with the selected data store;
instructing the external system to sort record IDs associated with the records associated with the selected data store; and
obtaining, from the external system, the set of record IDs associated with the sample size based at least in part on the sorted record IDs.

15. The method of claim 13, wherein determining the record-level access permissions associated with the user for the records in the selected data store associated with the set of record IDs comprises generating an application programming interface (API) call to the external system to use an impersonation function to test whether the user is permitted to perform a specified access type to a record in the selected data store associated with a record ID from the set of record IDs.

16. The method of claim 15, wherein the specified access type to the record comprises one or more of a read access, a write access, and a delete access.

17. The method of claim 15, further comprising, in response to a determination that the user is permitted to perform the specified access type to the record, determining whether the user is permitted to perform the specified access type to a field within the record.

18. The method of claim 13, wherein determining the record-level access permissions associated with the user for the records in the selected data store associated with the set of record IDs comprises parsing an audit log to determine whether the user is permitted to perform a specified access type to a record in the selected data store associated with a record ID from the set of record IDs.

19. The method of claim 13, wherein inferring the one or more data store-level access permissions associated with the user for the selected data store based at least in part on the record-level access permissions associated with the user for the records in the selected data store comprises:
determining a respective percentage of permitted record-level read access permissions from the record-level read access permissions associated with the user that were determined for the selected sample of records;
comparing the respective percentage against a threshold percentage; and
inferring the user's table-level read access permission based at least in part on the comparison of the respective percentage against the threshold percentage.

* * * * *